United States Patent
Macy, Jr. et al.

(10) Patent No.: US 9,678,753 B2
(45) Date of Patent: *Jun. 13, 2017

(54) SIMD SIGN OPERATION

(71) Applicant: Intel Corporation, Santa Clara, CA (US)

(72) Inventors: William W. Macy, Jr., Palo Alto, CA (US); Huy V. Nguyen, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/066,468

(22) Filed: Mar. 10, 2016

(65) Prior Publication Data

US 2016/0188332 A1 Jun. 30, 2016

Related U.S. Application Data

(60) Continuation of application No. 13/844,034, filed on Mar. 15, 2013, now Pat. No. 9,329,862, which is a (Continued)

(51) Int. Cl.
*G06F 7/00* (2006.01)
*G06F 9/30* (2006.01)

(52) U.S. Cl.
CPC .......... *G06F 9/3016* (2013.01); *G06F 9/3001* (2013.01); *G06F 9/30014* (2013.01); (Continued)

(58) Field of Classification Search
None
See application file for complete search history.

(56) References Cited

U.S. PATENT DOCUMENTS 5,128,890 A 7/1992 Girardeau, Jr.
5,243,625 A 9/1993 Verbakel et al.
(Continued)

FOREIGN PATENT DOCUMENTS

GB 1186572 A 4/1970
JP 63-501828 A 7/1988
(Continued)

OTHER PUBLICATIONS

Office Action received for European Patent Application No. 03258226.4, mailed on Oct. 13, 2009, 3 pages.
(Continued)

*Primary Examiner* — Tan V. Mai
(74) *Attorney, Agent, or Firm* — Vecchia Patent Agent, LLC

(57) ABSTRACT

Method, apparatus, and program means for nonlinear filtering and deblocking applications utilizing SIMD sign and absolute value operations. The method of one embodiment comprises receiving first data for a first block and second data for a second block. The first data and said second data are comprised of a plurality of rows and columns of pixel data. A block boundary between the first block and the second block is characterized. A correction factor for a deblocking algorithm is calculated with a first instruction for a sign operation that multiplies and with a second instruction for an absolute value operation. Data for pixels located along said block boundary between the first and second block are corrected.

21 Claims, 19 Drawing Sheets

Related U.S. Application Data continuation of application No. 13/602,502, filed on Sep. 4, 2012, now Pat. No. 8,510,363, which is a continuation of application No. 12/231,966, filed on Sep. 8, 2008, now Pat. No. 8,271,565, which is a division of application No. 10/610,665, filed on Jun. 30, 2003, now Pat. No. 7,424,501.

(52) U.S. Cl.
CPC ...... *G06F 9/30036* (2013.01); *G06F 9/30101* (2013.01); *G06F 9/30145* (2013.01)

(56) References Cited

U.S. PATENT DOCUMENTS

| | | | |
|---|---|---|---|
| 5,349,545 | A | 9/1994 | Keith |
| 5,422,964 | A | 6/1995 | Devimeux et al. |
| 5,610,850 | A | 3/1997 | Uratani et al. |
| 5,675,526 | A | 10/1997 | Peleg et al. |
| 5,742,529 | A | 4/1998 | Mennemeier et al. |
| 5,880,979 | A | 3/1999 | Mennemeier et al. |
| 6,036,350 | A | 3/2000 | Mennemeier et al. |
| 6,038,583 | A | 3/2000 | Oberman et al. |
| 6,163,567 | A | 12/2000 | Hatch |
| 6,243,803 | B1 | 6/2001 | Abdallah et al. |
| 6,292,814 | B1 | 9/2001 | Sazzad |
| 6,351,293 | B1 | 2/2002 | Perlow |
| 6,377,970 | B1 | 4/2002 | Abdallah et al. |
| 6,397,240 | B1 | 5/2002 | Fernando et al. |
| 6,434,275 | B1 | 8/2002 | Fukuda et al. |
| 6,490,607 | B1 | 12/2002 | Oberman |
| 6,539,408 | B1 * | 3/2003 | Gley .............. G06F 7/544 708/207 |
| 6,952,193 | B2 | 10/2005 | Abe et al. |
| 7,050,504 | B2 | 5/2006 | Joch et al. |
| 7,216,138 | B2 | 5/2007 | Abdallah et al. |
| 7,424,501 | B2 | 9/2008 | Macy, Jr. |
| 7,480,685 | B2 | 1/2009 | Johnson et al. |
| 7,516,307 | B2 | 4/2009 | Abdallah et al. |
| 7,539,714 | B2 | 5/2009 | Macy, Jr. et al. |
| 8,271,565 | B2 | 9/2012 | Macy, Jr. |
| 8,510,363 | B2 | 8/2013 | Macy, Jr. et al. |
| 2004/0267856 | A1 | 12/2004 | Macy, Jr. |
| 2006/0013454 | A1 | 1/2006 | Flewelling et al. |
| 2009/0077143 | A1 | 3/2009 | Macy, Jr. |
| 2012/0331272 | A1 | 12/2012 | Macy, Jr. et al. |
| 2013/0232182 | A1 | 9/2013 | Macy, Jr. |

FOREIGN PATENT DOCUMENTS

| | | |
|---|---|---|
| JP | 63-310023 A | 12/1988 |
| JP | 04-155503 A | 5/1992 |
| JP | 11-500547 A | 1/1999 |
| RU | 2139564 C1 | 10/1999 |
| WO | 87/02156 A2 | 4/1987 |
| WO | 97/08608 A1 | 3/1997 |

OTHER PUBLICATIONS

Search report received for European Patent Application No. 03258226.4, mailed on Dec. 17, 2007, 6 pages.
Office Action received for Taiwan Patent Application No. 092128278, mailed on Jan. 17, 2007, 3 pages of English Translation only.
Office Action received for Taiwan Patent Application No. 092128278, mailed on Sep. 12, 2006, 3 pages of English Translation only.
Nakagawa, Masahiro, "Synergetic Neural Networks: Between Top-Down and Bottom-Up Approaches", Journal of the Institute of Electronics, Information, and Communication Engineers, Institute of Electronics, Information, and Communication Engineers, vol. 84, No. 9, Sep. 1, 2001, pp. 649-655.
Non-Final Office Action received for U.S. Appl. No. 10/610,665, mailed on Jan. 4, 2007, 5 pages.
Non-Final Office Action received for U.S. Appl. No. 10/610,665, mailed on Jul. 19, 2007, 4 pages.
Notice of Allowance received for U.S. Appl. No. 10/610,665, mailed on Apr. 30, 2008, 4 pages.
Final Office Action received for U.S. Appl. No. 10/610,929, mailed on Mar. 30, 2007, 8 pages
Non-Final Office Action received for U.S. Appl. No. 10/610,929, mailed on Jun. 22, 2006, 8 pages.
Non-Final Office Action received for U.S. Appl. No. 10/610,929, mailed on Jun. 30, 2008, 8 pages.
Notice of Allowance received for U.S. Appl. No. 10/610,929, mailed on Jan. 16, 2009, 6 pages.
Office Action received for European Patent Application No. 10184624.4, mailed on Dec. 14, 2011, 7 pages.
Non-Final Office Action received for U.S. Appl. No. 12/231,966, mailed on Apr. 28, 2011, 7 pages.
Notice of Allowance received for U.S. Appl. No. 12/231,966, mailed on May 21, 2012, 5 pages.
Non-Final Office Action received for U.S. Appl. No. 13/602,502, mailed on Nov. 26, 2012, 4 pages
Notice of Allowance received for U.S. Appl. No. 13/602,502, mailed on Apr. 10, 2013, 6 pages.
Non-Final Office Action received for U.S. Appl. No. 13/844,034, mailed on May 29, 2015, 7 pages.
Notice of Allowance received for U.S. Appl. No. 13/844,034, mailed on Dec. 10, 2015, 5 pages.
Notice of Allowance received for U.S. Appl. No. 13/844,034, mailed on Nov. 9, 2015, 5 pages.
Office Action received for Korean Patent Application No. 2003-0099839, mailed on Jul. 28, 2006, 4 pages (2 pages of English Translation and 2 pages of Korean Office Action).
Office Action received for Korean Patent Application No. 2003-0099839, mailed on Sep. 30, 2005, 5 pages (3 pages of English Translation and 2 pages of Korean Office Action).
Office Action received for Singapore Patent Application No. 200307424-2, mailed on Jan. 15, 2008, 4 pages.
Search report and Written Opinion received for Singapore Patent Application No. 200307424-2, mailed on Jan. 15, 2007, 11 pages.
Office Action received for Chinese Patent Application No. 200310113082.2, mailed on Feb. 20, 2009, 6 pages (2 pages Of English Translation and 4 pages. Of Chinese Office Action).
Office Action received for Chinese Patent Application No. 200310113082.2, mailed on Jul. 24, 2009, 8 pages (3 pages of English Translation and 5 pages of Chinese Office Action).
Office Action received for Chinese Patent Application No. 200310113082.2, mailed on Jul. 27, 2007, 6 pages (4 pages of English Translation and 2 pages of Chinese Office Action).
Office Action received for Chinese Patent Application No. 200310113082.2, mailed on May 16, 2008, 8 pages (3 pages of English Translation and 5 pages of Chinese Office Action).
Notice of Allowance received for Chinese Application No. 200310113082.2, issued on Nov. 20, 2009, 4 pages (2 pages of English translation and 2 pages of Official copy).
Notice of Allowance received for Russian Patent Application No. 2003137709, mailed on Dec. 6, 2005, 25 pages (10 pages of English Translation and 15 pages of Official copy).
Office Action received for Russian Patent Application No. 2003137709, mailed on Mar. 14, 2005, 9 pages (5 pages of English Translation and 4 pages of Russian Office Action).
Office Action received for Russian Patent Application No. 2003137709, mailed on Oct. 11, 2004, 8 pages (4 pages of English Translation and 4 pages of Russian Office Action).
Office Action received for Japanese Patent Application No. 2003-425712, mailed on Nov. 10, 2009, 8 pages (4 pages of English Translation and 4 pages of Japanese Office Action).
Notice of Allowance received for Japanese Patent Application No. 2003-425712, mailed on Oct. 25, 2011, 3 pages of Official copy only.
Office Action received for Japanese Patent Application No. 2003-425712, mailed on Oct. 26, 2010, 4 pages (2 pages of English Translation and 2 pages of Japanese Office Action).

(56) References Cited

OTHER PUBLICATIONS

Deknuydt et al., "A Deblocking Scheme Suitable for Use Inside the Codec Loop", Eiectrotechnical Conference, 1994 Proceedings, 7th Mediterranean, vol. 1, Apr. 12-14, 1994, 7 pages.
Soloviev, G.N., "Computing Arithmetic Units", Energy-Publishers, 1978, 8 pages.
Kim et al., "A Deblocking Filter with Two Separate Modes in Block-Based Video Coding", IEEE Transactions on Circuits and Systems for Video Technology, vol. 9, Issue 1, Feb. 1999, pp. 156-160.

* cited by examiner

| 127 | 120 119 | 112 111 | 104 103 | | | | 24 23 | 16 15 | 8 7 | 0 |
|---|---|---|---|---|---|---|---|---|---|---|
| bbbb bbbb | bbbb bbbb | bbbb bbbb | • | • | • | bbbb bbbb | bbbb bbbb | bbbb bbbb |

UNSIGNED PACKED BYTE REPRESENTATION 344

| 127 | 120 119 | 112 111 | 104 103 | | | | 24 23 | 16 15 | 8 7 | 0 |
|---|---|---|---|---|---|---|---|---|---|---|
| sbbb bbbb | sbbb bbbb | sbbb bbbb | • | • | • | sbbb bbbb | sbbb bbbb | sbbb bbbb |

SIGNED PACKED BYTE REPRESENTATION 345

| 127 | 112 111 | | | | 16 15 | 0 |
|---|---|---|---|---|---|---|
| wwww wwww wwww wwww | • | • | • | wwww wwww wwww wwww |

UNSIGNED PACKED WORD REPRESENTATION 346

| 127 | 112 111 | | | | 16 15 | 0 |
|---|---|---|---|---|---|---|
| swww wwww wwww wwww | • | • | • | swww wwww wwww wwww |

SIGNED PACKED WORD REPRESENTATION 347

| 127 | 92 91 | 32 31 | 0 |
|---|---|---|---|
| dddd dddd dddd dddd dddd dddd dddd dddd | • • • | dddd dddd dddd dddd dddd dddd dddd dddd |

UNSIGNED PACKED DOUBLEWORD REPRESENTATION 348

| 127 | 92 91 | 32 31 | 0 |
|---|---|---|---|
| sddd dddd dddd dddd dddd dddd dddd dddd | • • • | sddd dddd dddd dddd dddd dddd dddd dddd |

SIGNED PACKED DOUBLEWORD REPRESENTATION 349

*FIG. 3C*

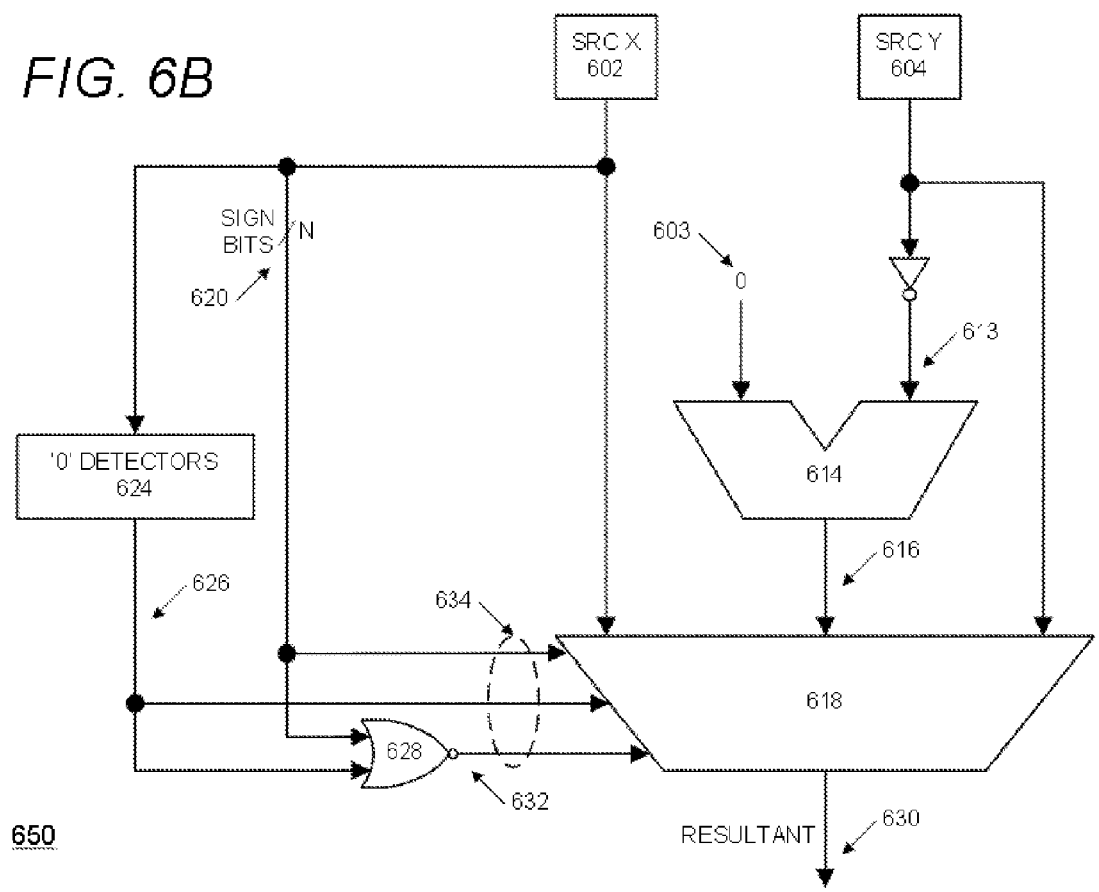

SIMD SIGN OPERATION

CROSS REFERENCE TO OTHER APPLICATIONS

This patent application is a Continuation of U.S. patent application Ser. No. 13/844,034, filed Mar. 15, 2013, which is a Continuation of U.S. patent application Ser. No. 13/602,502, filed Sep. 4, 2012, now U.S. Pat. No. 8,510,363, issued on Aug. 13, 2013, which is a Continuation of U.S. patent application Ser. No. 12/231,966, filed Sep. 8, 2008, now U.S. Pat. No. 8,271,565, issued on Sep. 18, 2012, which is a Division of U.S. patent application Ser. No. 10/610,665, filed Jun. 30, 2003, now U.S. Pat. No. 7,424,501, issued on Sep. 9, 2008. The specification of this application discloses similar subject matter as U.S. patent application Ser. No. 10/610,929, entitled, "A Method, Apparatus, And Instruction For Performing A Sign Operation That Multiplies" filed Jun. 30, 2003, now U.S. Pat. No. 7,539,714. U.S. patent application Ser. No. 10/610,665 is hereby incorporated by reference.

FIELD OF THE INVENTION

The present disclosure pertains to the field of processing apparatuses and associated software and software sequences that perform mathematical operations.

DESCRIPTION OF RELATED ART

Computer systems have become increasingly pervasive in our society. The processing capabilities of computers have increased the efficiency and productivity of workers in a wide spectrum of professions. As the costs of purchasing and owning a computer continues to drop, more and more consumers have been able to take advantage of newer and faster machines. Furthermore, many people enjoy the use of notebook computers because of the freedom. Mobile computers allow users to easily transport their data and work with them as they leave the office or travel. This scenario is quite familiar with marketing staff, corporate executives, and even students.

As processor technology advances, newer software code is also being generated to run on machines with these processors. Users generally expect and demand higher performance from their computers regardless of the type of software being used. One such issue can arise from the kinds of instructions and operations that are actually being performed within the processor. Certain types of operations require more time to complete based on the complexity of the operations and/or type of circuitry needed. This provides an opportunity to optimize the way certain complex operations are executed inside the processor.

Media applications have been driving microprocessor development for more than a decade. In fact, most computing upgrades in recent years have been driven by media applications. These upgrades have predominantly occurred within consumer segments, although significant advances have also been seen in enterprise segments for entertainment enhanced education and communication purposes. Nevertheless, future media applications will require even higher computational requirements. As a result, tomorrow's personal computing experience will be even richer in audio-visual effects, as well as being easier to use, and more importantly, computing will merge with communications.

Accordingly, the display of images, as well as playback of audio and video data, which is collectively referred to as content, have become increasingly popular applications for current computing devices. Filtering and convolution operations are some of the most common operations performed on content data, such as image audio and video data. Such operations are computationally intensive, but offer a high level of data parallelism that can be exploited through an efficient implementation using various data storage devices, such as for example, single instruction multiple data (SIMD) registers. A number of current architectures also require unnecessary data type changes which minimizes instruction throughput and significantly increases the number of clock cycles required to order data for arithmetic operations.

Various prior art sign related instructions, such as a signum instruction. determine the sign of a binary number. However, the capabilities of these prior art signum instructions are limited in usefulness, especially in applications where the further processing of the signum results is needed because these results are intermediate results of larger algorithms. By requiring additional instructions to achieve the desired results, additional costs were incurred in terms of processing resources and pipeline slots.

BRIEF DESCRIPTION OF THE FIGURES

The present invention is illustrated by way of example and not limitation in the Figures of the accompanying drawings:

FIG. 3C illustrates various signed and unsigned packed data type representations in multimedia registers according to one embodiment of the present invention;

FIG. 6B is a block diagram of another embodiment of a circuit for performing a sign operation in accordance with the present invention;

DETAILED DESCRIPTION

Figure 1A:
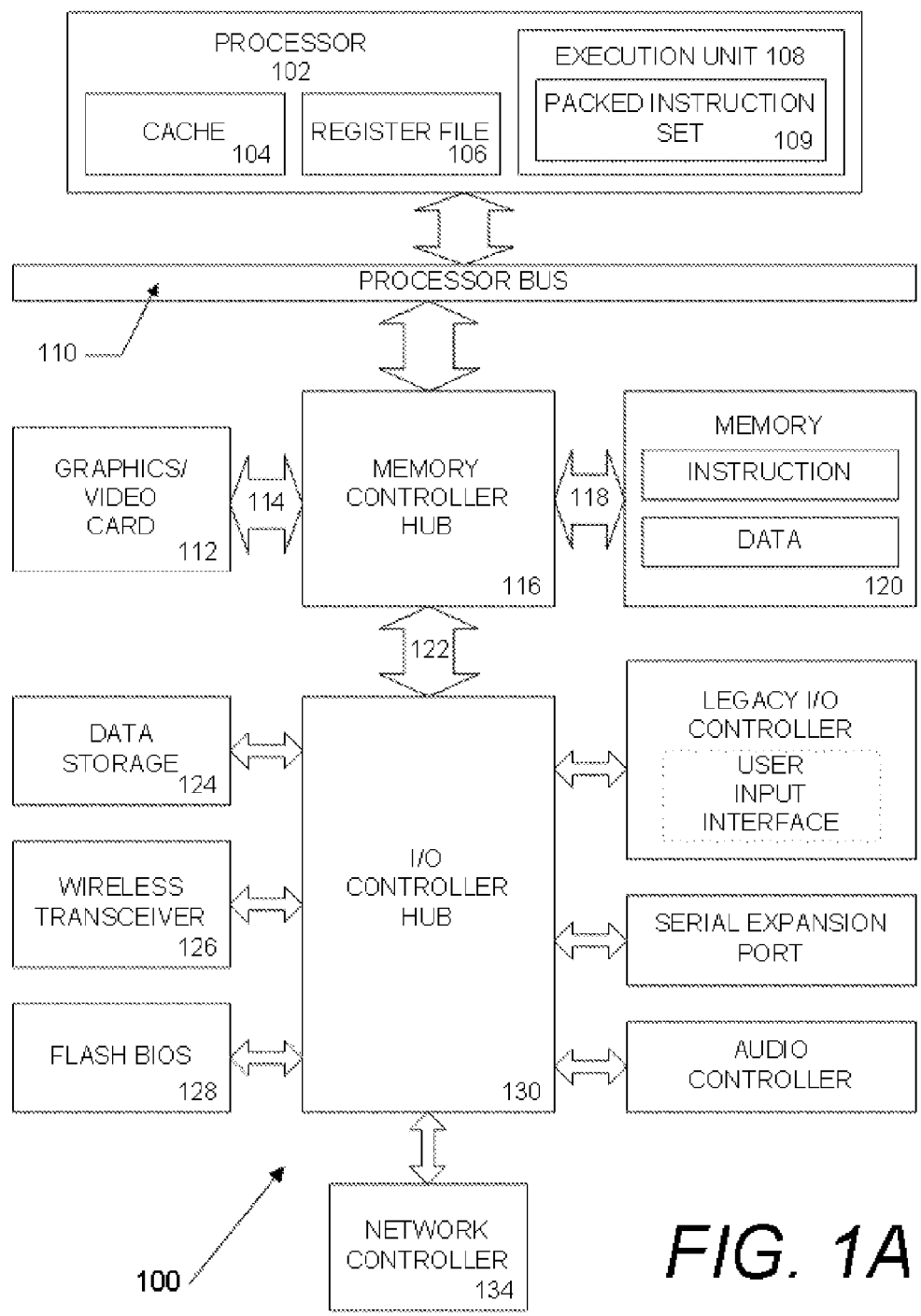
FIG. 1A is a block diagram of a computer system formed with a processor that includes execution units to execute an instruction for a sign operation that multiplies in accordance with one embodiment of the present invention.

The following description describes embodiments of non-linear filtering and deblocking applications utilizing SIMD sign and absolute value operations. In the following description, numerous specific details such as processor types, micro-architectural conditions, events, enablement mechanisms, and the like are set forth in order to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

Although the following embodiments are described with reference to a processor, other embodiments are applicable to other types of integrated circuits and logic devices. The same techniques and teachings of the present invention can easily be applied to other types of circuits or semiconductor devices that can benefit from higher pipeline throughput and improved performance. The teachings of the present invention are applicable to any processor or machine that performs data manipulations. However, the present invention is not limited to processors or machines that perform 256 bit, 128 bit, 64 bit, 32 bit, or 16 bit data operations and can be applied to any processor and machine in which manipulation of packed data is needed.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention.

Although the below examples describe instruction handling and distribution in the context of execution units and logic circuits, other embodiments of the present invention can be accomplished by way of software. In one embodiment, the methods of the present invention are embodied in machine-executable instructions. The instructions can be used to cause a general-purpose or special-purpose processor that is programmed with the instructions to perform the steps of the present invention. The present invention may be provided as a computer program product or software which may include a machine or computer-readable medium having stored thereon instructions which may be used to program a computer (or other electronic devices) to perform a process according to the present invention. Alternatively, the steps of the present invention might be performed by specific hardware components that contain hardwired logic for performing the steps, or by any combination of programmed computer components and custom hardware components. Such software can be stored within a memory in the system. Similarly, the code can be distributed via a network or by way of other computer readable media.

Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like. Accordingly, the computer-readable medium includes any type of media/machine-readable medium suitable for storing or transmitting electronic instructions or information in a form readable by a machine (e.g., a computer). Moreover, the present invention may also be downloaded as a computer program product. As such, the program may be transferred from a remote computer (e.g., a server) to a requesting computer (e.g., a client). The transfer of the program may be by way of electrical, optical, acoustical, or other forms of data signals embodied in a carrier wave or other propagation medium via a communication link (e.g., a modem, network connection or the like).

A design may go through various stages, from creation to simulation to fabrication. Data representing a design may represent the design in a number of manners. First, as is useful in simulations, the hardware may be represented using a hardware description language or another functional description language Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

In modern processors, a number of different execution units are used to process and execute a variety of code and instructions. Not all instructions are created equal as some are quicker to complete while others can take an enormous number of clock cycles. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more and more computer systems are used in internet and multimedia applications, additional processor support has been introduced over time. For instance, Single Instruction, Multiple Data (SIMD) integer/floating point instructions and Streaming SIMD Extensions (SSE) are instructions that reduce the overall number of instructions required to execute a particular program task, which in turn can reduce the power consumption. These instructions can speed up software performance by operating on multiple data elements in parallel. As a result, performance gains can be achieved in a wide range of applications including video, speech, and image/photo processing. The implementation of SIMD instructions in microprocessors and similar types of logic circuit usually involve a number of issues. Furthermore, the complexity of SIMD operations often leads to a need for additional circuitry in order to correctly process and manipulate the data.

Presently a SIMD sign instruction that multiplies is not available. Nor is there a SIMD instruction for absolute value operations. Without the presence of a sign operation that multiplies, a large number of instructions and data registers are needed to accomplish the same results in applications such as audio/video compression, processing, and manipulation. Thus, a sign instructions in accordance to the present invention can reduce code overhead and resource requirements. Embodiments of the present invention provide a way to implement a sign operation as an algorithm that makes use of SIMD related hardware. Some embodiments also provide ways to implement an absolute value operation. Presently, it is somewhat difficult and tedious to operate on data in a SIMD register. Some algorithms require more instructions to arrange data for arithmetic operations than the actual number of instructions to execute those operations. By implementing embodiments of a sign operation that multiplies in accordance with the present invention, the number of instructions needed to achieve sign processing can be drastically reduced.

Embodiments of the present invention involve an instruction for implementing a variation of a signum operation. A signum operation determines whether a given number is positive, negative, or zero. During a signum operation, the function evaluates a number as: for x>0, signum(x)=1; for x=0, signum(x)=0; and for x<0, signum(x)=−1. However, in multimedia applications, the multiplication of a data value by the sign of another value is often needed during various algorithms. A sign operation that multiplies can avoid having to do many separate operations. Embodiments of the present sign operation provides more functionality than the signum and also includes the multiplication.

A sign instruction in accordance to the present invention computes the operation: DEST=SRC1×SIGNUM(SRC2). If SRC2 is positive, the signum of SRC2 will provide a value of '+1'. If SRC2 is equal to zero, the result of the signum of SRC2 is zero. If SRC2 is negative, then the signum of SRC2 is '−1'. The sign operation that multiplies as in embodiment of the present invention takes the signum of a second data element and multiplies the signum result with the value of a first data element to obtain a resultant product. The sign operation of one embodiment as applied to an individual data element can be represented as:

if SOURCE2<0, then DEST=SOURCE1×'−1';

else if SOURCE2==0, then DEST=0;

else if SOURCE2>0, then DEST=SOURCE1×'+1'.

For a packed data operand, this flow can be applied to each data element position.

Furthermore, one embodiment of a sign operation that multiplies can also mimic the signum operation by using the value '1' as the first source element and the value of interest as the second source element in a sign operation. Because the sign operation of this embodiment causes a multiplication of the first source element with one of '+1', '0', or '−1' based on the sign value of the second element, signum can be replicated here. Similarly, embodiments of the sign operation of this invention can also perform absolute value operations by setting first source element to the sign operation equal to the second source element. This is achievable because the source value will essentially be multiplied by its own sign, thus making the resultant value a '0' or positive.

FIG. 1A is a block diagram of an exemplary computer system formed with a processor that includes execution units to execute an instruction for a sign operation that multiplies in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, the present invention is not limited to any specific combination of hardware circuitry and software.

The present enhancement is not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that performs sign and/or absolute value operations on operands. Furthermore, some architectures have been implemented to enable instructions to operate on several data simultaneously to improve the efficiency of multimedia applications. As the type and volume of data increases, computers and their processors have to be enhanced to manipulate data in more efficient methods.

FIG. 1A is a block diagram of a computer system 100 formed with a processor 102 that includes one or more execution units 108 to perform an algorithm to extract the sign of a data element from one operand and multiply that sign with another data element in accordance with the present invention. The present embodiment is described in the context of a single processor desktop or server system, but alternative embodiments can be included in a multiprocessor system. System 100 is an example of a hub architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For this embodiment, execution unit 108 includes logic to handle a packed instruction set 109. In one embodiment, the packed instruction set 109 includes a packed sign instruction for modifying the sign value of data. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an execution unit to execute an algorithm with a sign instruction can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
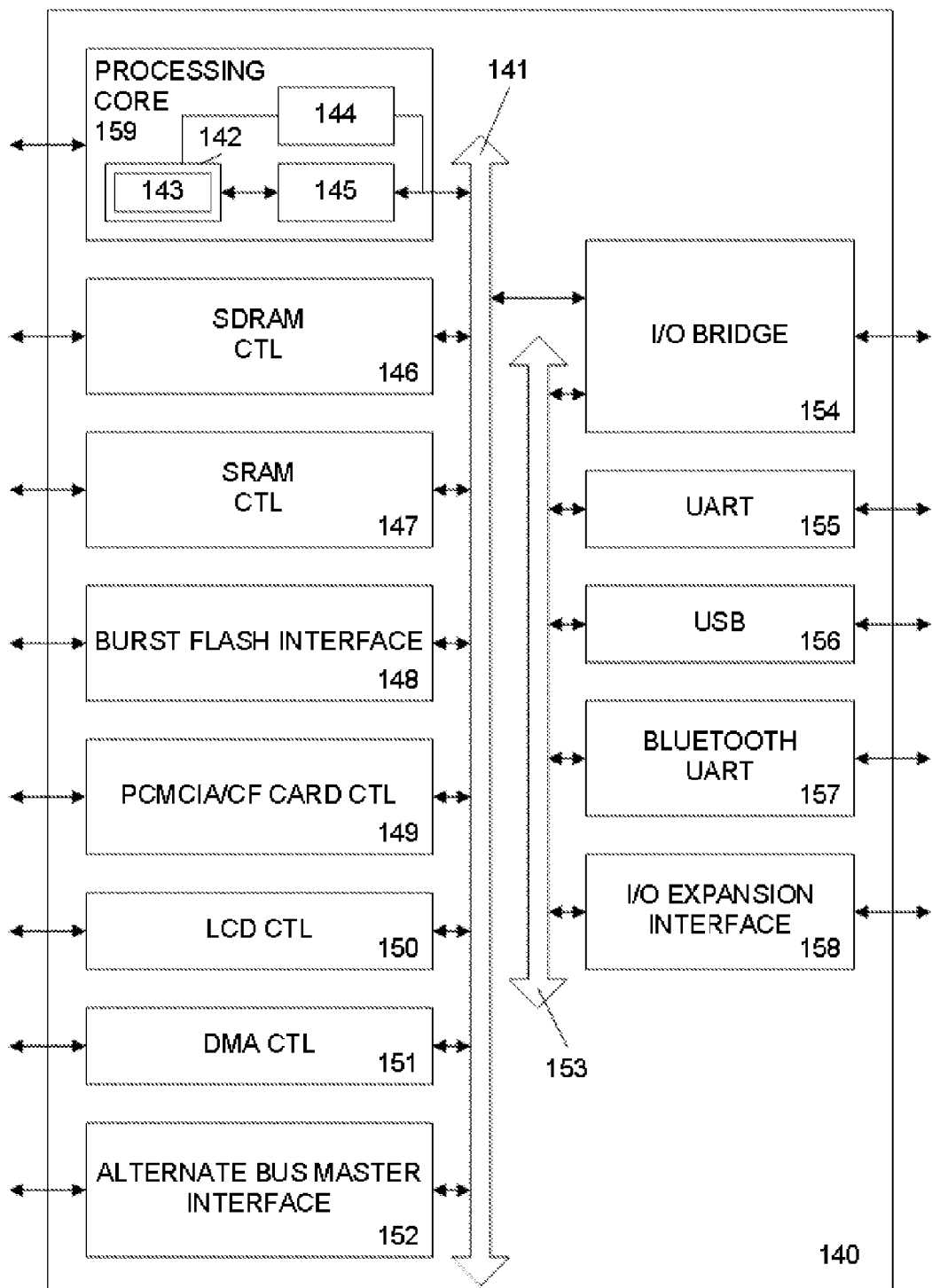
FIG. 1B is a block diagram of another exemplary computer system in accordance with an alternative embodiment of the present invention.

FIG. 1B illustrates an alternative embodiment of a data processing system 140 which implements the principles of the present invention. One embodiment of data processing system 140 is an Intel® Personal Internet Client Architecture (Intel® PCA) applications processors with Intel XScale™ technology (as described on the world-wide web at developer.intel.com). It will be readily appreciated by one of skill in the art that the embodiments described herein can be used with alternative processing systems without departure from the scope of the invention.

Computer system 140 comprises a processing core 159 capable of performing SIMD operations including a sign and absolute value. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of the present invention. Execution unit 142 is used for executing instructions received by processing core 159. In addition to recognizing typical processor instructions, execution unit 142 can recognize instructions in packed instruction set 143 for performing operations on packed data formats. Packed instruction set 143 includes instructions for supporting sign and absolute value operations, and may also include other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a sign or absolute value operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
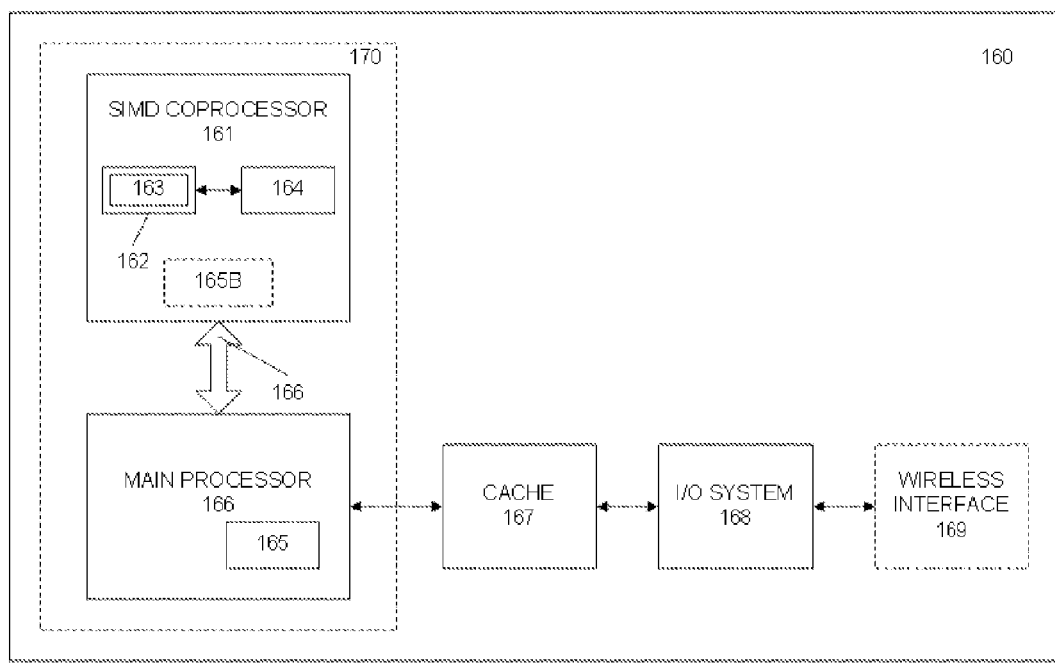
FIG. 1C is a block diagram of yet another exemplary computer system in accordance with another alternative embodiment of the present invention.

FIG. 1C illustrates yet alternative embodiments of a data processing system capable of performing SIMD sign or absolute value operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing SIMD operations including sign or absolute value. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 including SIMD sign and absolute value instructions for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of the present invention.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 166 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including SIMD sign and absolute value instructions.

Figure 2:
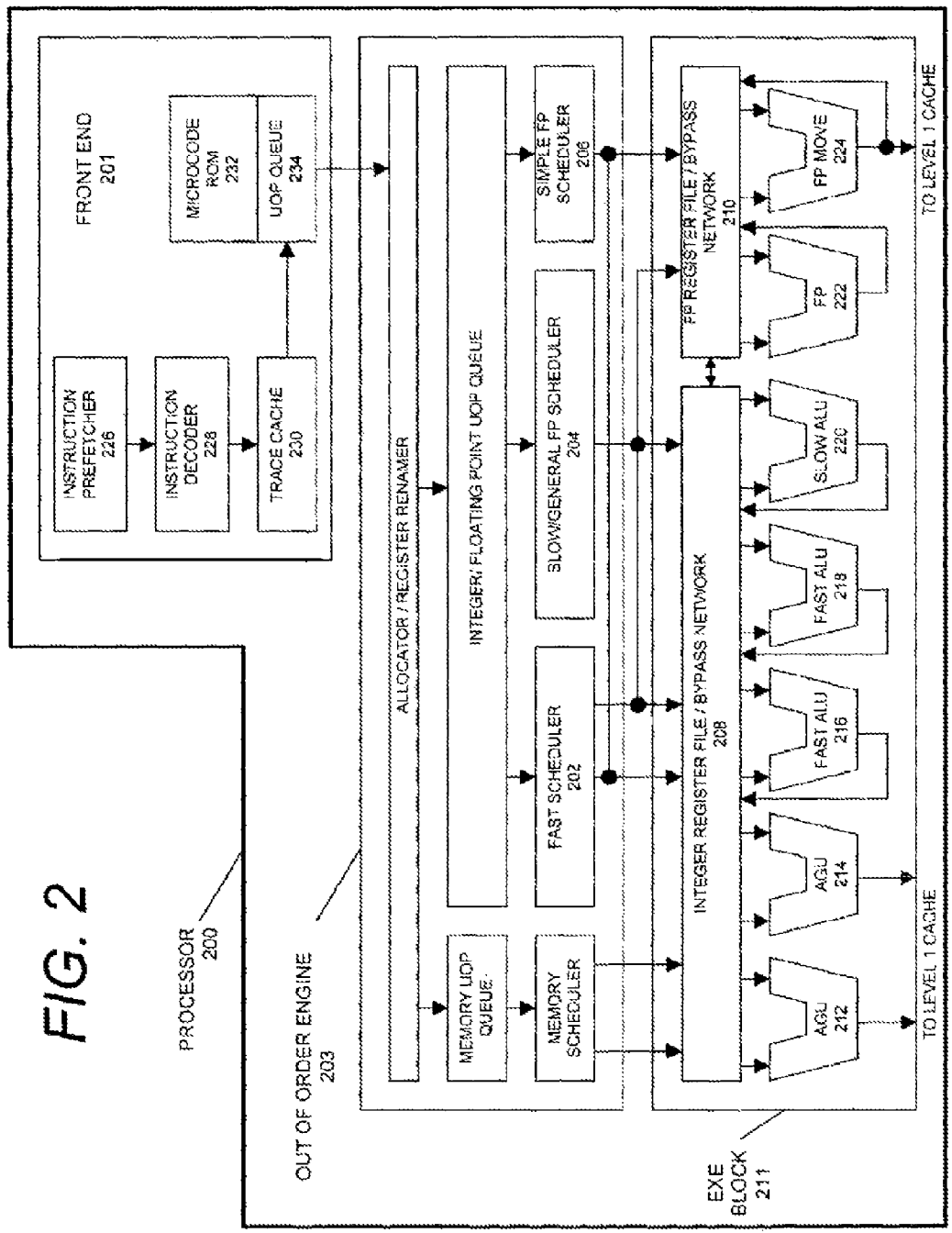
FIG. 2 is a block diagram of the micro-architecture for a processor of one embodiment that includes logic circuits to perform a sign operation that multiplies in accordance with the present invention.

FIG. 2 is a block diagram of the micro-architecture for a processor 200 of one embodiment that includes logic circuits to perform a sign operation that multiplies in accordance with the present invention. The sign operation may also be referred to as a packed sign operation and packed sign instruction as in the discussion above. For one embodiment of the sign instruction, the instruction can multiply a first data element with the sign value of a second data element. That instruction can also be referred to as PSIGN or packed sign. In this embodiment, the sign instruction can also be implemented to operate on data elements having sizes of byte, word, doubleword, quadword, etc. The in-order front end 201 is the part of the processor 200 that fetches the macro-instructions to be executed and prepares them to be used later in the processor pipeline. The front end 201 of this embodiment includes several units. The instruction prefetcher 226 fetches macro-instructions from memory and feeds them to an instruction decoder 228 which in turn decodes them into primitives called micro-instructions or micro-operations (also called micro op or uops) that the machine know how to execute. The trace cache 230 takes decoded uops and assembles them into program ordered sequences or traces in the uop queue 234 for execution. When the trace cache 230 encounters a complex macro-instruction, the microcode ROM 232 provides the uops needed to complete the operation.

Many macro-instructions are converted into a single micro-op, and others need several micro-ops to complete the full operation. In this embodiment, if more than four micro-ops are needed to complete a macro-instruction, the decoder 228 accesses the microcode ROM 232 to do the macro-instruction. For one embodiment, a packed sign instruction can be decoded into a small number of micro ops for processing at the instruction decoder 228. In another embodiment, an instruction for a packed sign algorithm can be stored within the microcode ROM 232 should a number of micro-ops be needed to accomplish the operation. The trace cache 230 refers to a entry point programmable logic array (PLA) to determine a correct micro-instruction pointer for reading the micro-code sequences for the sign or absolute value algorithms in the micro-code ROM 232. After the microcode ROM 232 finishes sequencing micro-ops for the current macro-instruction, the front end 201 of the machine resumes fetching micro-ops from the trace cache 230.

Some SIMD and other multimedia types of instructions are considered complex instructions. Most floating point related instructions are also complex instructions. As such, when the instruction decoder 228 encounters a complex macro-instruction, the microcode ROM 232 is accessed at the appropriate location to retrieve the microcode sequence for that macro-instruction. The various micro-ops needed for performing that macro-instruction are communicated to the out-of-order execution engine 203 for execution at the appropriate integer and floating point execution units.

The out-of-order execution engine 203 is where the micro-instructions are prepared for execution. The out-of-order execution logic has a number of buffers to smooth out and re-order the flow of micro-instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of this embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of this embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of this embodiment is comprised of a number of execution units: address generation unit (AGU) 212, AGU 214, fast ALU 216, fast ALU 218, slow ALU 220, floating point ALU 222, floating point move unit 224. For this embodiment, the floating point execution blocks 222, 224, execute floating point, MMX, SIMD, and SSE operations. The floating point ALU 222 of this embodiment includes a 64 bit by 64 bit floating point divider to execute divide, square root, and remainder micro-ops. For embodiments of the present invention, any act involving a floating point value occurs with the floating point hardware. For example, conversions between integer format and floating point format involve a floating point register file. Similarly, a floating point divide operation happens at a floating point divider. On the other hand, non-floating point numbers and integer type are handled with integer hardware resources. The simple, very frequent ALU operations go to the high-speed ALU execution units 216, 218. The fast ALUs 216, 218, of this embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For this embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In this embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for sign and absolute value operations.

The term "registers" is used herein to refer to the on-board processor storage locations that are used as part of macro-instructions to identify operands. In other words, the registers referred to herein are those that are visible from the outside of the processor (from a programmer's perspective). However, the registers of an embodiment should not be limited in meaning to a particular type of circuit. Rather, a register of an embodiment need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operated with packed data elements that accompany SIMD and SSE instructions. Similarly, 128 bits wide XMM registers relating to SSE2 technology can also be used to hold such packed data operands. In this embodiment, in storing packed data and integer data, the registers do not need to differentiate between the two data types.

Figure 3A:
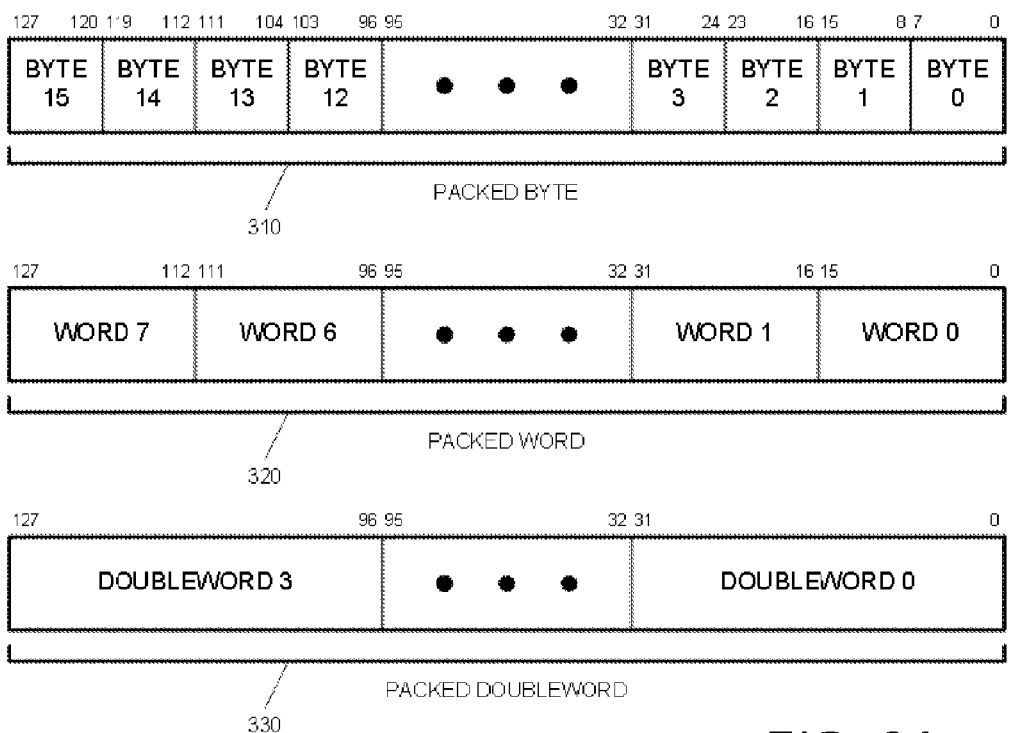
FIG. 3A illustrates various packed data type representations in multimedia registers according to one embodiment of the present invention.

In the examples of the following figures, a number of data operands are described. FIG. 3A illustrates various packed data type representations in multimedia registers according to one embodiment of the present invention. FIG. 3A illustrates data types for a packed byte 310, a packed word 320, and a packed doubleword (dword) 330 for 128 bits wide operands. The packed byte format 310 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSE2 technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A are 128 bit long, embodiments of the present invention can also operate with 64 bit wide or other sized operands. The packed word format 320 of this example is 128 bits long and contains eight packed word data elements. Each packed word contains sixteen bits of information. The packed doubleword format 330 of FIG. 3A is 128 bits long and contains four packed doubleword data elements. Each packed doubleword data element contains thirty two bits of information. A packed quadword is 128 bits long and contains two packed quad-word data elements.

Figure 3B:
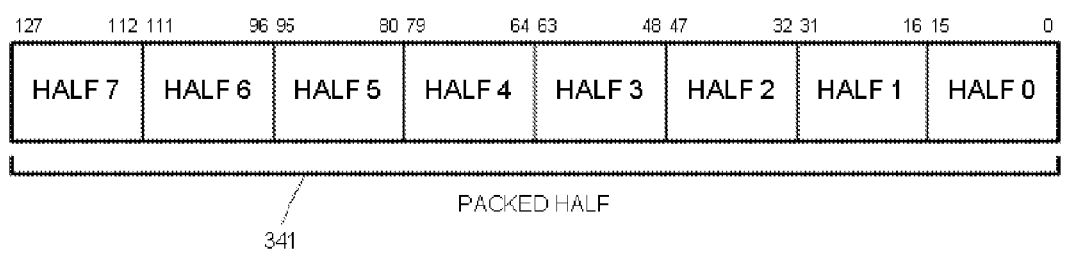
FIG. 3B illustrates packed data-types in accordance with an alternative embodiment.
Figure 3B:
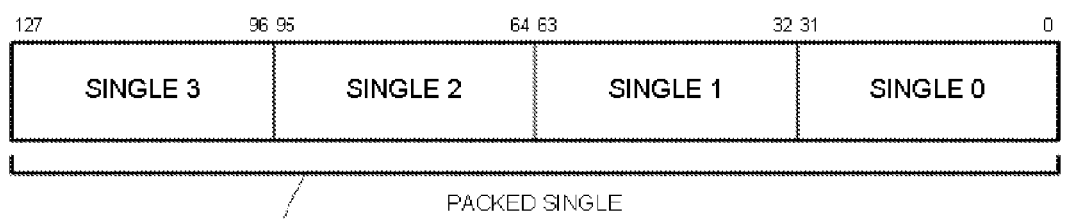
Figure 3B:
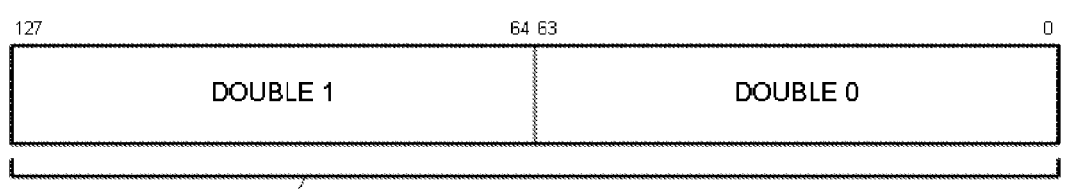

FIG. 3B illustrates alternative in-register data storage formats. Each packed data can include more than one independent data element. Three packed data formats are illustrated; packed half 341, packed single 342, and packed double 343. One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is one hundred twenty-eight bits long containing eight 16-bit data elements. One embodiment of packed single 342 is one hundred twenty-eight bits long and contains four 32-bit data elements. One embodiment of packed double 343 is one hundred twenty-eight bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers according to one embodiment of the present invention. Unsigned packed byte representation 344 illustrates the storage of an unsigned packed byte in a SIMD register. Information for each byte data element is stored in bit seven through bit zero for byte zero, bit fifteen through bit eight for byte one, bit twenty-three through bit sixteen for byte two, and finally bit one hundred twenty through bit one hundred twenty-seven for byte fifteen. Thus, all available bits are used in the register. This storage arrangement can increase the storage efficiency of the processor. As well, with sixteen data elements accessed, one operation can now be performed on sixteen data elements in a parallel fashion. Signed packed byte representation 345 illustrates the storage of a signed packed byte. Note that the eighth bit of every byte data element is the sign indicator. Unsigned packed word representation 346 illustrates how word seven through word zero are stored in a SIMD register. Signed packed word representation 347 is similar to the unsigned packed word in-register representation 346. Note that the sixteenth bit of each word data element is the sign indicator. Unsigned packed doubleword representation 348 shows how doubleword data elements are stored. Signed packed doubleword representation 349 is similar to unsigned packed doubleword in-register representation 348. Note that the necessary sign bit is the thirty-second bit of each doubleword data element.

Figure 3D:
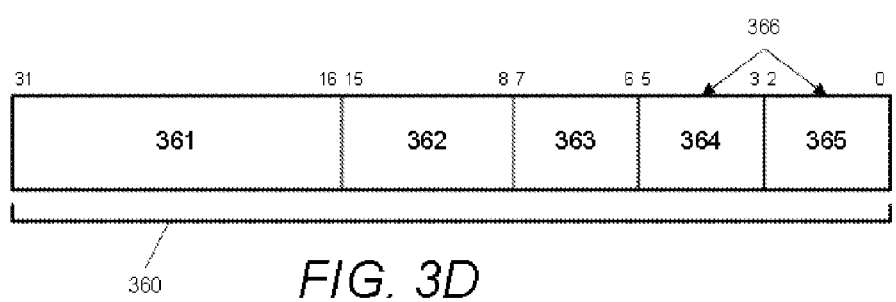
FIG. 3D illustrates one embodiment of an operation encoding (opcode) format.

FIG. 3D is a depiction of one embodiment of an operation encoding (opcode) format 360, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. The type of sign operation that multiplies, may be encoded by one or more of fields 361 and 362. Up to two operand locations per instruction may be identified, including up to two source operand identifiers 364 and 365. For one embodiment of the sign instruction, destination operand identifier 366 is the same as source operand identifier 364. For an alternative embodiment, destination operand identifier 366 is the same as source operand identifier 365. Therefore, for embodiments of a sign operation that multiplies, one of the source operands identified by source operand identifiers 364 and 365 is overwritten by the results of the sign operations. For one embodiment of the sign instruction, operand identifiers 364 and 365 may be used to identify 64-bit source and destination operands.

Figure 3E:
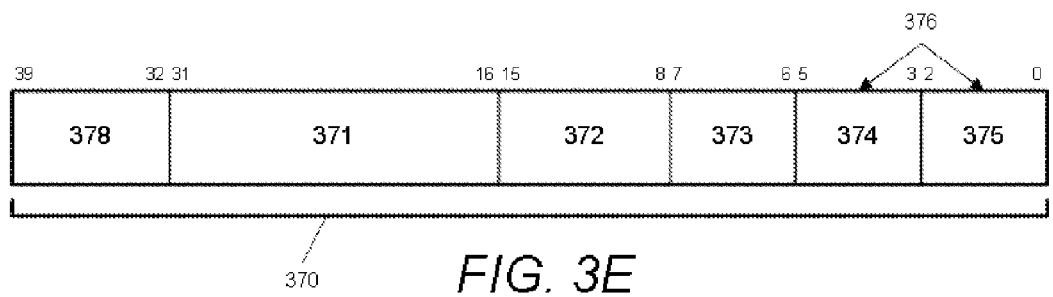
FIG. 3E illustrates an alternative operation encoding (opcode) format.

FIG. 3E is a depiction of another alternative operation encoding (opcode) format 370, having forty or more bits. Opcode format 370 corresponds with opcode format 360 and comprises an optional prefix byte 378. The type of sign operation that multiplies, may be encoded by one or more of fields 378, 371, and 372. Up to two operand locations per instruction may be identified by source operand identifiers 374 and 375 and by prefix byte 378. For one embodiment of the sign instruction, prefix byte 378 may be used to identify 128-bit source and destination operands. For one embodiment of the sign instruction, destination operand identifier 376 is the same as source operand identifier 374. For an alternative embodiment, destination operand identifier 376 is the same as source operand identifier 375. Therefore, for embodiments of the sign operations that multiply, one of the source operands identified by source operand identifiers 374 and 375 is overwritten by the results of the sign operations. Opcode formats 360 and 370 allow register to register, memory to register, register by memory, register by register, register by immediate, register to memory addressing specified in part by MOD fields 363 and 373 and by optional scale-index-base and displacement bytes.

Figure 3F:
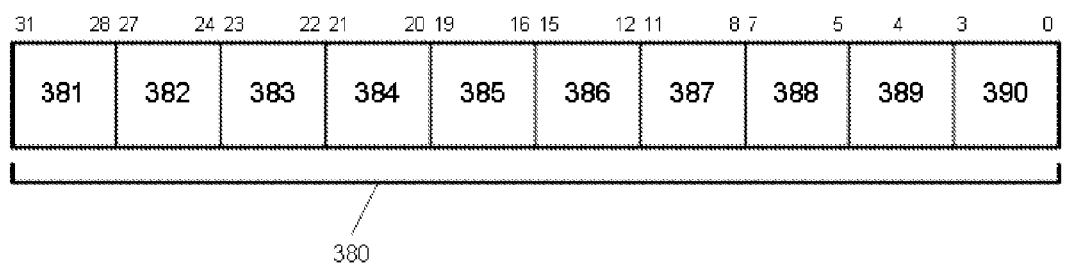
FIG. 3F illustrates yet another alternative operation encoding format.

Turning next to FIG. 3F, in some alternative embodiments, 64 bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments of sign or absolute value operations, may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, the sign or absolute value operation is performed on integer data elements. In some embodiments, a sign or absolute value instruction may be executed conditionally, using condition field 381. For some sign or absolute value instructions source data sizes may be encoded by field 383. In some embodiments of a sign or absolute value instruction, Zero (Z), negative (N), carry (C), and overflow (V) detection can be done on SIMD fields. For some instructions, the type of saturation may be encoded by field 384.

Figure 4:
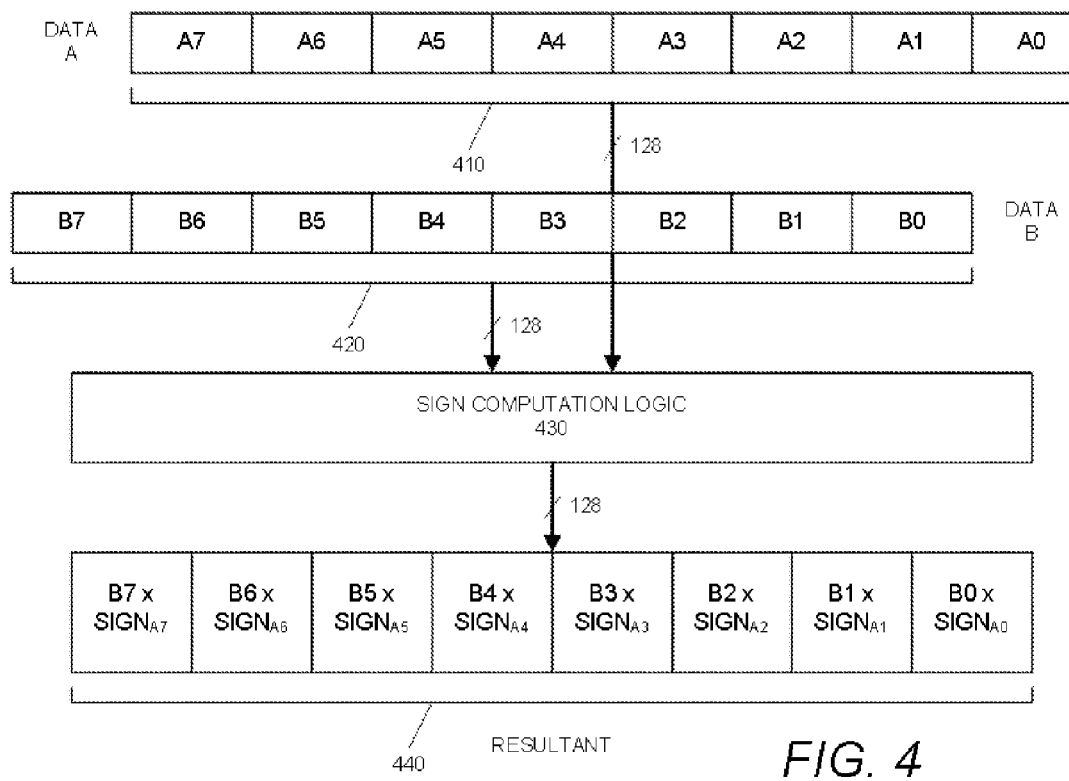
FIG. 4 is a block diagram of one embodiment of logic to perform a sign operation on packed data operands in accordance with the present invention.

FIG. 4 is a block diagram of one embodiment of logic to perform a sign operation on packed data operands in accordance with the present invention. Embodiments of the present invention can be implemented to function with various types of operands such as those described above. For one implementation, sign operations in accordance to the present invention are implemented as a set of instructions to operate on specific data types. For instance, a packed sign bytes (PSIGNB) instruction is provided to determine the sign for byte data types. A packed sign words (PSIGNW) instruction is to cause sign operations on word data types. A packed sign doublewords (PSIGND) instruction is to perform sign operations that multiply on doubleword data types. Although these instructions have different names, the general sign operation that multiplies performs in a similar fashion. For simplicity, the following discussions and examples below are in the context of a packed sign (PSIGN) instruction to process data elements.

The PSIGN instruction for a sign operation that multiplies of this embodiment begins with two pieces of information: a first data operand DATA A 410 and a second data operand DATA B 420. For the following discussions, DATA A, DATA B, and RESULTANT are generally referred to as operands or data blocks, but not restricted as such, and also include registers, register files, and memory locations. In one embodiment, each sign instruction (PSIGNB, PSIGNW, PSIGND) is decoded into one micro-operation. In an alternative embodiment, each instruction may be decoded into a various number of micro-ops to perform the sign operation on the data operands. For this example, the operands 410, 420, are 128 bit wide pieces of information stored in a source register/memory having word wide data elements. In one embodiment, the operands 410, 420, are held in 128 bit long SIMD registers, such as 128 bit SSE2 XMM registers. For one embodiment, the RESULTANT 440 is also a XMM data register. Furthermore, RESULTANT 440 may also be the same register or memory location as one of the source operands. Depending on the particular implementation, the operands and registers can be other lengths such as 32, 64, and 256 bits, and have byte, doubleword, or quadword sized data elements. Although the data elements of this example are word size, the same concept can be extended to byte and doubleword sized elements. Where the data operands are 64 bit wide, MMX registers are used in place of the XMM registers.

The first operand 410 in this example is comprised of a set of eight data elements: A7, A6, A5, A4, A3, A2, A1, and A0. Each individual data element corresponds to a data element position in the resultant 440. The second operand 420 is comprised of another set of eight data segments: B7, B6, B5, B4, B3, B2, B1, and B0. The data segments here are of equal length and each comprise of a single word (16 bits) of data. However, data elements and data element positions can possess other granularities other than words. If each data element was a byte (8 bits), doubleword (32 bits), or a quadword (64 bits), the 128 bit operands would have sixteen byte wide, four doubleword wide, or two quadword wide data elements, respectively. Embodiments of the present invention are not restricted to particular length data operands or data segments, and can be sized appropriately for each implementation.

The operands 410, 420, can reside either in a register or a memory location or a register file or a mix. The data operands 410, 420, are sent to the sign computation logic 430 of an execution unit in the processor along with a sign instruction. By the time the sign instruction reaches the execution unit, the instruction should have been decoded earlier in the processor pipeline. Thus the sign instruction can be in the form of a micro operation (uop) or some other decoded format. For this embodiment, the two data operands 410, 420, are received at sign computation logic 430. The sign computation logic 430 selects the sign value or signum for each data element of the first operand 410, multiplies that sign value with the value of the data element in the corresponding data element position of the second operand 420, and places the product for that multiplication into the appropriate position in the resultant 440. Although the general concept of a multiply operation is discussed here, other methods and means to achieve the same desired results as a multiply with a multiplication are possible. For example, in one embodiment, multiplication can be performed with a multiplication unit. In another embodiment, the same results can be obtained by logic to process an algorithm to leave a value unchanged, set to zero, or changing a sign from '+' to '−' or vice versa.

This processing of the sign extraction and multiplication is repeated for the entire set of data element positions in the first operand 410. Although the data processing of this embodiment is comprised of the sign extraction and multiplication, the terms 'sign operation' or 'sign operation that multiplies' may also be used generally here to reference this data processing. For one embodiment, the data elements for all of the data positions are processed in parallel. In another embodiment, a certain portion of the data element positions can be processed together at a time. Here, the resultant 440 is comprised of eight products: $B7 \times SIGN_{A7}$, $B6 \times SIGN_{A6}$, $B5 \times SIGN_{A5}$, $B4 \times SIGN_{A4}$, $B3 \times SIGN_{A3}$, $B2 \times SIGN_{A2}$, $B1 \times SIGN_{A1}$, and $B0 \times SIGN_{A0}$. For this embodiment, the signum or sign value ($SIGN_x$) for a data element is a '+1' for a positive non-zero number, a '−1' for a negative non-zero number, and a '0' for a zero. In one alternative embodiment where the architecture allows for a '+0' and a '−0', both types of zeroes are treated as a zero, wherein the signum or sign value of the data element is a '0'.

Figure 5:
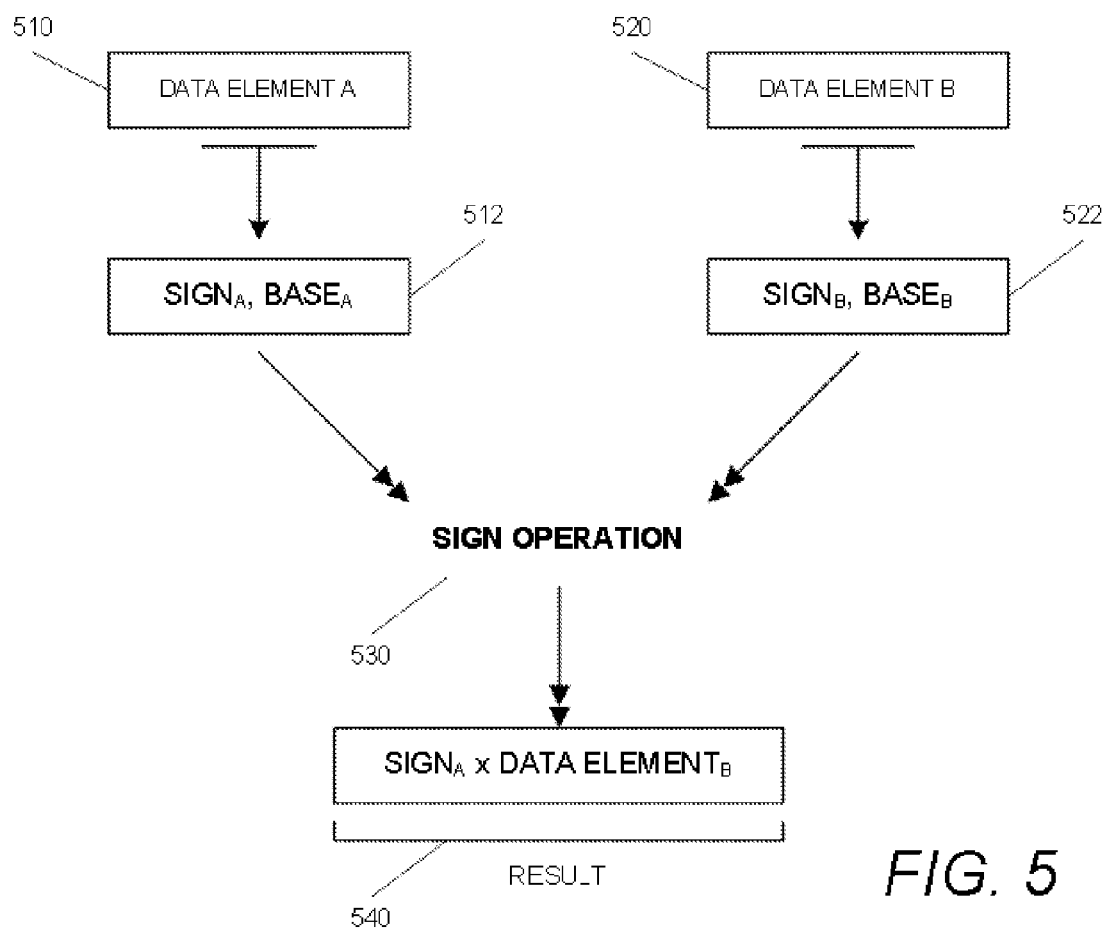
FIG. 5 illustrates the operation of a sign operation that multiplies on data elements in accordance with one embodiment of the present invention.

FIG. 5 illustrates the operation of a sign operation that multiplies on data elements in accordance with one embodiment of the present invention. The sign operation of this example can occur within the sign computation logic 430 of FIG. 4. In this example, the sign operation 530 is described with the data elements for a single data element position. A first data element, DATA ELEMENT A 510, from a first data operand and a second data element, DATA ELEMENT B 520, from a second data operand are brought together. Each data element is comprised of a value having a sign portion and a numeric value base portion. For example, DATA ELEMENT A 510 is interpreted as a number 512 comprised of $SIGN_A$ and $BASE_A$. Similarly, DATA ELEMENT B 520 is interpreted as a number 522 comprised of $SIGN_B$ and $BASE_B$.

During the sign operation 530, the sign computation logic takes the sign value of the first operand, $SIGN_A$ for DATA ELEMENT A 510, and multiplies that sign value with the number in DATA ELEMENT B 520. In one instance, the logic is to perform the appropriate multiplication operation in response to the value of $SIGN_A$. The sign portion for a number can be negative or positive '+'. The value portion of a number can be a zero '0' or a non-zero value. For the sign operation of one embodiment, the logic bins the first data element into one of three categories: positive '+', zero '0', or negative '−'. If the first data element 510 is positive, meaning its sign is positive, then the result 540 for that data position is essentially the second data element 520 itself, as a positive sign is treated as a multiply of the second data element 520 by a $SIGN_A$ equal to '+1'. If the first data element 510 is zero, the sign value of the first data element 510 is disregarded as the zero is essentially calling for a multiply of the second data element 520 by a $SIGN_A$ equal to zero, which yields a result 540 of zero. If the first data element 510 is negative, meaning its sign is negative, then the result 540 for that data position is going to be the product of the multiplication of the second data element 520 by a $SIGN_A$ equal to '−1'. The result 540 of the sign operation that multiplies for a given data element position involving DATA ELEMENT A 510 and DATA ELEMENT B 520 is '$SIGN_A \times DATA\ ELEMENT_B$'. In another embodiment, the logic may be able to multiply the sign values, $SIGN_A$ and $SIGN_B$, together and apply the resultant sign value to $BASE_B$ to form the final result for that data element position.

Figure 6A:
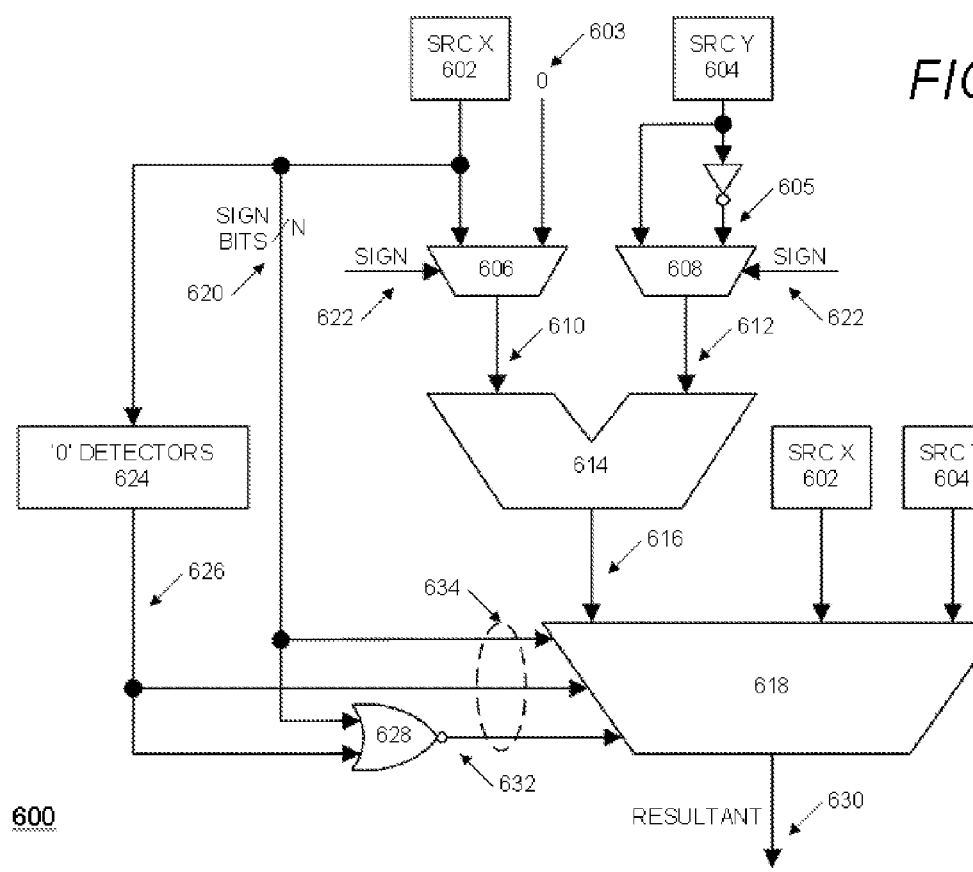
FIG. 6A is a block diagram of one embodiment of a circuit for performing a sign operation in accordance with the present invention.

FIG. 6A is a block diagram of one embodiment of a circuit 600 for performing a sign operation that multiplies in accordance with the present invention. The circuit 600 of this embodiment comprises a multiplexing structure and logic to evaluate the sign value of an element from the first source operand and to effectively calculate the product of that sign value with a corresponding element from the second source operand. The circuit 600 in FIG. 6A is shown for one data element position or slice of the resultant packed data block for simplifying the discussion. Furthermore, the logic 600 as shown for this data element position can exist in multiple instantiations on the same execution unit. Depending on the particular implementation, a number of the circuit elements are extrapolated out as needed for the desired number of data elements. For example, with eight data elements, enough multiplexers and adders to handle all the bits of the eight data elements may be physically present. Similarly, there can be sixteen instantiations of the circuitry to handle two operands having sixteen data element each. In another embodiment, some of the logic like the adder 614, for instance, may shared among all the data element positions. In yet another implementation, the circuitry is capable of processing packed data and data for multiple data element positions can be processed through the logic together.

For this embodiment, a portion of the logic for the sign operation also shared with other packed operations in order to reduce the device count and redundancy. The circuit 600 of this embodiment receives input data elements from source operands and outputs a resultant data element for a particular data element position in a resultant packed data operand. Although the source elements, SRC X 602 and SRC Y 604, are referred to as single data elements here, it is understood that these elements are part of larger packed data operands that are accompany a packed sign instruction. In this embodiment, the first source data element, SRC X 602, is coupled to a two input (2:1) multiplexer (mux) 606. A SIGN signal 622 controls the operation of that 2:1 mux. For this embodiment, if a sign operation is being serviced, SIGN 622 causes the mux 606 to output the '0' that is coupled as the second input to the mux 606. If another type of operation is being performed, SIGN 622 causes the mux 606 to output SRC X 602.

The second source data element, SRC Y 604, of this embodiment, is coupled to another 2:1 mux 608 as inverted 605 and non-inverted 604 versions. If a sign operation is being performed, SIGN 622 causes the mux 608 to output the inverted input 605. In this example, the inverted version 605 of SRC Y 604 can be used to achieve a subtraction. The two muxes 606, 608, are coupled to an adder 614. The mux outputs 610, 612, are first and second inputs, respectively, to adder 614. Adder 614 is to add together its inputs to generate a sum at its output 616. During a sign operation, the adder receives '0' as its first input 610 and the inverted SRC Y 605 as its second input 612. The adder 614 appears to add the inverted SRC Y 605 to '0' 603. But the inversion of SRC Y 604 of this embodiment basically causes SRC Y 604 to change sign from positive to negative or from negative to positive. Thus, the inverted SRC Y 605 is essentially causing the adder 614 to mathematically subtract SRC Y 604 from '0' 603. The output 616 of adder 614 can be represented as the sum of '0−SRC Y'.

The data bits of SRC X 602 are also coupled to a zero detector circuit 624, which is to detect if SRC X 602 is equal to a zero value. The zero detector output 626 that indicates if an overall zero value is detected is coupled as a control signal to a three input (3:1) mux 618 and as an input to a logical NOR gate 628. The zero detection of one embodiment is performed in parallel with the addition and does not create any new critical timing paths. The N sign bits 620 of SRC X 602, N being a number of one or greater, are also coupled to the logical NOR gate 628 and as a control to the 3:1 mux 618. This NOR gate 628 is to output an active high signal if both of its inputs are active low. In this example, the NOR gate output 632 will be high if both the input of sign bits 620 is low, indicating that SRC X 602 is positive, and the input of the zero detectors result is low, indicating that SRC X 602 is a non-zero value.

The group of control signals 634 coupled to the 3:1 mux 618 operate to select the appropriate data value to output as resultant 630. Data values of SRC X 602, SRC Y 604, and the sum of '0−SRC Y' 616 are coupled as inputs to the 3:1 mux 618. For this embodiment, the signals 634 are to cause one of the inputs to be selected in accordance to one of three situations. The first case arises if the first source element SRC X 602 is a zero. In other words, the second data element 604 is to be multiplied by zero. This condition is indicated with the zero detector output 626. In this situation, the input of SRC X 602, which is a zero value here, is selected and outputted as resultant 630. In this embodiment, this zero condition the other control signals 620, 632, are trumped and a zero is outputted regardless of the sign value of SRC X 602 and the contents of SRC Y 604.

The second case arises if the first source element SRC X 602 is positive and a non-zero value. This condition is indicated with the NOR gate output 632. Essentially, the second data element 604 is to be multiplied by '+1', which will yield SRC Y 604 itself. In this case, the input of SRC Y 604 is selected and outputted as resultant 630. The third case arises if the first source element SRC X 602 is negative and a non-zero value. This situation is indicated with the N sign bits 620 of SRC X 602, which provide an active high value if SRC X 602 is negative and an active low value if SRC X 602 is positive. In this case, the input of the sum for '0−SRC Y' 616 is selected and outputted as resultant 630. Essentially, the negative sign of SRC X 602 is treated as a '−1' and the '0−SRC Y' calculation is mathematically equivalent to a multiplication of the second data element SRC Y 604 by a factor of '−1'. For this embodiment, the resultants for this and the other data element positions are packed together into a resultant data block having the same size as the source data operands. For example, if the source packed data operands are 64 or 128 bit wide, the resultant packed data block is also 64 or 128 bit wide, respectively. Furthermore, the source data operands for a sign operation can come from a register or a memory location. For this embodiment, the resultant packed data block overwrites the data in the SIMD register for one of the source data operands.

FIG. 6B is a block diagram of another embodiment of a circuit 650 for performing a sign operation in accordance with the present invention. While the circuit arrangement and connections are different, the general scheme and functionality of this embodiment is similar to that of the circuit 600 in FIG. 6A. The circuit 650 of this embodiment also includes a multiplexing structure and logic to evaluate the sign of a first data element and to multiply that sign with a second data element. This circuit 650 is shown and described in the context of a single data element position or slice of the resultant packed operand, but the apparatus and methodology can be extended as needed and applied to various length operands based on the particular implementation. Thus, certain circuit elements of FIG. 6B can be replicated in order to serve more data elements. For example, if the operands are capable of including sixteen data element positions, the circuitry of FIG. 6B can be expanded to support the sixteen data element positions.

The circuit 650 of this embodiment receives input data as a first data element SRC X 602 from a first packed operand and a second data element SRC Y 604 from a second packed operand. SRC X 602 is coupled to as an input to a 3:1 mux 618 and to zero detector logic 624. The zero detector 624 is to determine whether SRC X 602 is a zero. SRC Y 604 is coupled to the 3:1 mux 618 and an inverted version 613 (–SRC Y) is coupled to an adder 614. The adder 614 is to add the inverted SRC Y 613 to the other adder input, '0' 603 in this case, to obtain a sum at its output 616. By adding an inverted version of SRC Y 604, the adder is adding zero with negative SRC Y, or mathematically subtracting SRC Y from '0'. The output 616 for the adder 614 is '0–SRC Y' and is coupled as an input to the 3;1 mux 618. The value '0–SRC Y' is also equivalent to multiplying SRC Y 604 by '–1'.

The output signal 626 of the zero detector circuit 624 is coupled as a control signal to the 3:1 mux 618 and also as an input to a two input logical NOR gate 628. Similarly, the N sign bits 620 of SRC X 602 are coupled to the 3:1 618 as a control and as the other input to the NOR gate 628. The output 632 of the NOR gate 628 for this embodiment is active high if the sign bits 620 and the zero detector output 626 are both active low. The NOR gate output 632 is also coupled to the 3:1 mux 618 as a control signal. This set of control signals 634 is to select one of the three mux inputs 602, 604, 616, to output as the resultant 630 depending on which of the conditions exists. The three situations, as described above for FIG. 6A, are: (1) SRC X 602 is a zero; (2) SRC X 602 is positive and a non-zero value; and (3) SRC X 602 is negative and a non-zero value. For the first case, SRC X 602, which will be a zero, is selected. In the second case, SRC Y 604, which is equal to 'SRC Y x+1', is selected. For the third case, '0–SRC Y' 616, which is equal to 'SRC Y x–1' is selected. The resultant for each data element position is packed together with others into a resultant data operand.

Figure 7:
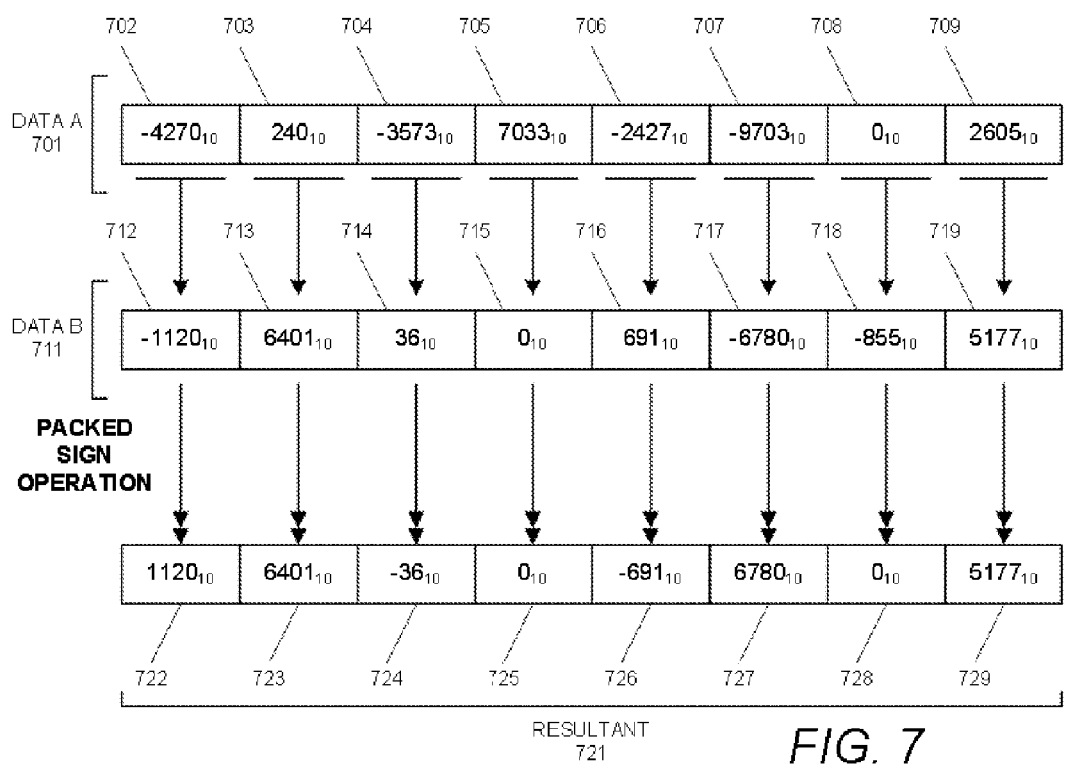
FIG. 7 illustrates the operation of a packed sign instruction on a plurality data elements in accordance with one embodiment of the present invention.

FIG. 7 illustrates the operation of a packed sign instruction on a plurality data elements in accordance with one embodiment of the present invention. This is an example of the instruction "PSIGNW DATA B, DATA A". The PSIGNW instruction is to cause a sign operation that multiplies to operate on word size data elements in the first source packed operand DATA B 711 and the second source packed operand DATA A 701. The description here is also applicable to other packed sign instructions like PSIGNB and PSIGND. In this example, the signs from one source data 701 are applied to the values of another source data 711 via multiplication to obtain a product that is organized into a destination data storage device 721. The two source operands, DATA A 701 and DATA B 711, are each comprised of eight packed data elements in this example, as does the resultant 721. In this embodiment, each of the data elements involved is eight bits or a byte wide. Thus, DATA A 701, DATA B 711, and RESULTANT 721 data blocks are each 128 bits long. Furthermore, these data blocks can reside in memory and/or registers.

As shown in FIG. 7, DATA A 702 includes data elements with numeric values in base 10 of: '–4270' 702, '240' 703, '–3573' 704, '7033' 705, '–2427' 706, '–9703' 707, '0' 708, '2605' 709. Similarly, DATA B 711 includes source data elements with base 10 values of: '–1120' 712, '6401' 713, '36' 714, '0' 715, '691' 716, '–6780' 717, '–855' 718, '5177' 719. The base 10 numbers are further noted below with a subscript $_{10}$ suffix. Accordingly, the sign for each data element in the second data operand 701 is extracted and multiplied with the number for each data element in the corresponding data element position in the first data operand 711. If a number is '0' for a data element in the second operand 701, a '0' is also entered in the corresponding resultant data element position. For one embodiment, the processing of a sign operation that multiplies for one or more data element positions in the source data 701, 711, can be perform in parallel.

As the sign value for each of the data elements in the second operand 701 are evaluated, the number in the corresponding data element position in the first operand 711 is multiplied by appropriate factor. For this embodiment, the multiplicand is either '0', or '+1', depending on the sign value of the second operand data element. Although the sign operation is described here with multiplication, an actual multiplication operation may not be physically necessary to arrive at the same mathematical result. For instance, it is unnecessary to do a multiplication with '0' to arrive at a product of '0'. Nor is it physically necessary to multiply a number by '+1' as the product will be the number itself. Similarly, the result of a multiplication of a number by can also be achieved by subtracting the number from '0'.

For instance, the left most data element 702 of the second operand 701 has a value of '–4270$_{10}$', which is a negative number. Meanwhile, the left most data element 712 of the first operand 711 contains a value of '–1120$_{10}$'. Because the sign value of the second operand data element 702 is negative, the value '–1120$_{10}$' of the corresponding first operand data element 712 is conceptually multiplied by to yield a product of '1120$_{10}$' during the packed sign operation. The product is stored into the appropriate data element position 722 of the resultant 721.

Similarly, the right most data element 709 of the second operand 701 has a value of '2605$_{10}$', which is a positive number. Meanwhile, the right most data element 719 of the first operand 711 contains a value of '5177$_{10}$'. Because the sign value of the second operand data element 709 is positive, the value '5177$_{10}$' of the corresponding first operand data element 719 is conceptually multiplied by '+1' to yield a product of '5177$_{10}$' during the packed sign operation. The product is stored into the right most data element position 729 of the resultant 721. Given that the sign value of the second operand data element 709 is positive here, an actual multiplication would not be needed as the product 729 is simply the value of the first operand data element 719.

At the second data element 708 from the right in the second operand 701, the value is '$0_{10}$'. Meanwhile, the second data element 718 from the right in the first operand 711 contains a value of '$-855_{10}$'. Because the number of the second operand data element 708 is zero, the value '$-855_{10}$' of the corresponding data element 718 is basically being multiplies by '0' to yield a product of '0' during the packed sign operation. Thus, a '0' is stored into the second data element position 728 from the right in the resultant 721. Because the second operand data element 708 has a zero value, a multiplication is unnecessary to realize the product will be '0'. Similarly, a zero value in a second operand data element is defined in this embodiment to cause a '0' in the resultant position regardless of any sign value that may exist for the second operand data element.

Figure 8A:
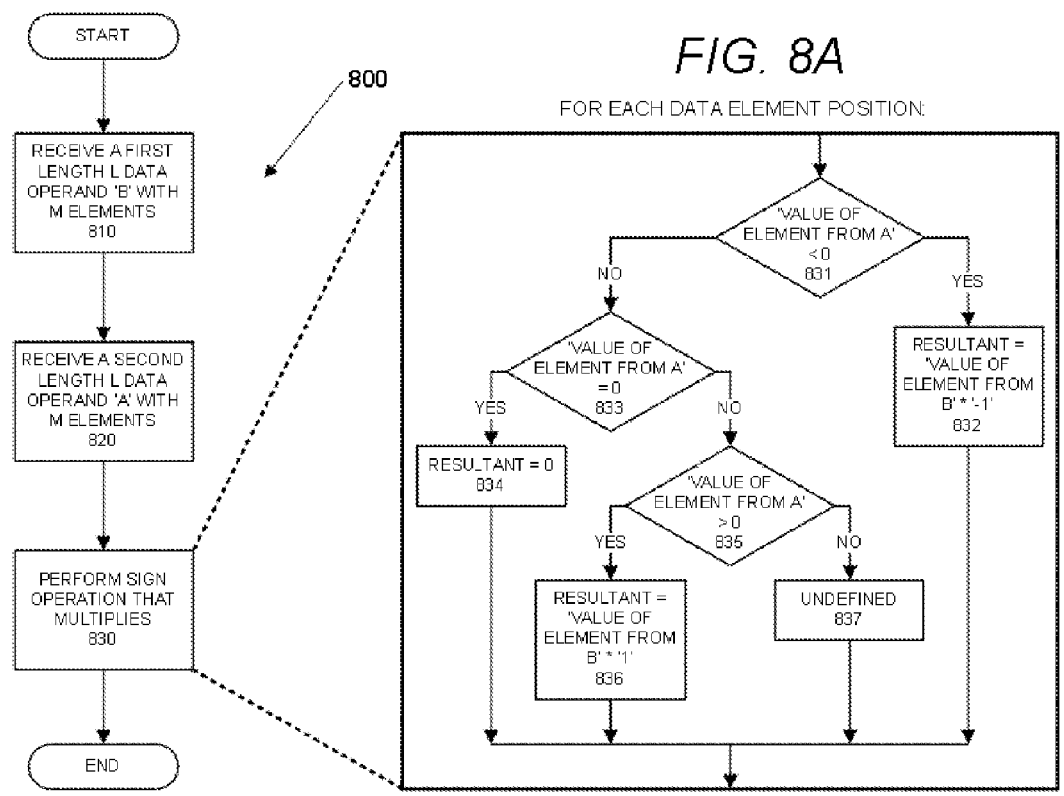
FIG. 8A is a flow chart illustrating one embodiment of a method to perform a sign operation.

FIG. 8A is a flow chart 800 illustrating one embodiment of a method to perform a sign operation. The length value of L is used here to represent the width of the operands and data blocks. Depending on the particular embodiment, L can be used to designate the width in terms of number of bits, bytes, words, etc. Similarly, the term M is used to designate the number of data elements or segments packed within an operand. At block 810, a first length L data operand B having M elements is received. A second length L data operand A also having M elements is received at block 820. For this embodiment, the source operands and resultant are of equal length and have the same number of data elements. At block 830, an instruction to perform a sign operation that multiplies is processed.

The details of the sign operation at block 830 of this embodiment are further described in terms of what occurs for each data element position. For one embodiment, the sign operation for all of the packed resultant data element positions are processed in parallel. In another embodiment, a certain portion of the data elements may be processed at a time. At block 831, a check is made to determine whether the value for the element from data operand A is negative (less than zero). If the value is determined to be negative, the resultant value for this particular data element position is calculated at block 832 as the product of the value for the element from data operand B multiplied by '−1'. If the value for the element from operand A is not negative at block 831, a determination is made at block 833 as to whether the value for the element from operand A is equal to zero. If the value is determined to be zero, the resultant value for this data element position is set to '0' at block 834. But if the value for the operand A element is not found equal to zero at block 833, yet another determination is made at block 835 as to whether the value for this operand A element is positive (greater than zero). If the value for this operand A element is positive, the resultant value for this particular data element position is calculated at block 836 as the product of the value for the operand B data element multiplied by '+1'. If the value of the operand A element is not positive at block 835 for this embodiment, the value is treated as undefined at block 837 as none of the three situations (positive, '0', negative) apply. These resultant values for these different data elements are arranged into the appropriate data element positions corresponding to the source element pairs in the resultant packed operand.

Figure 8B:
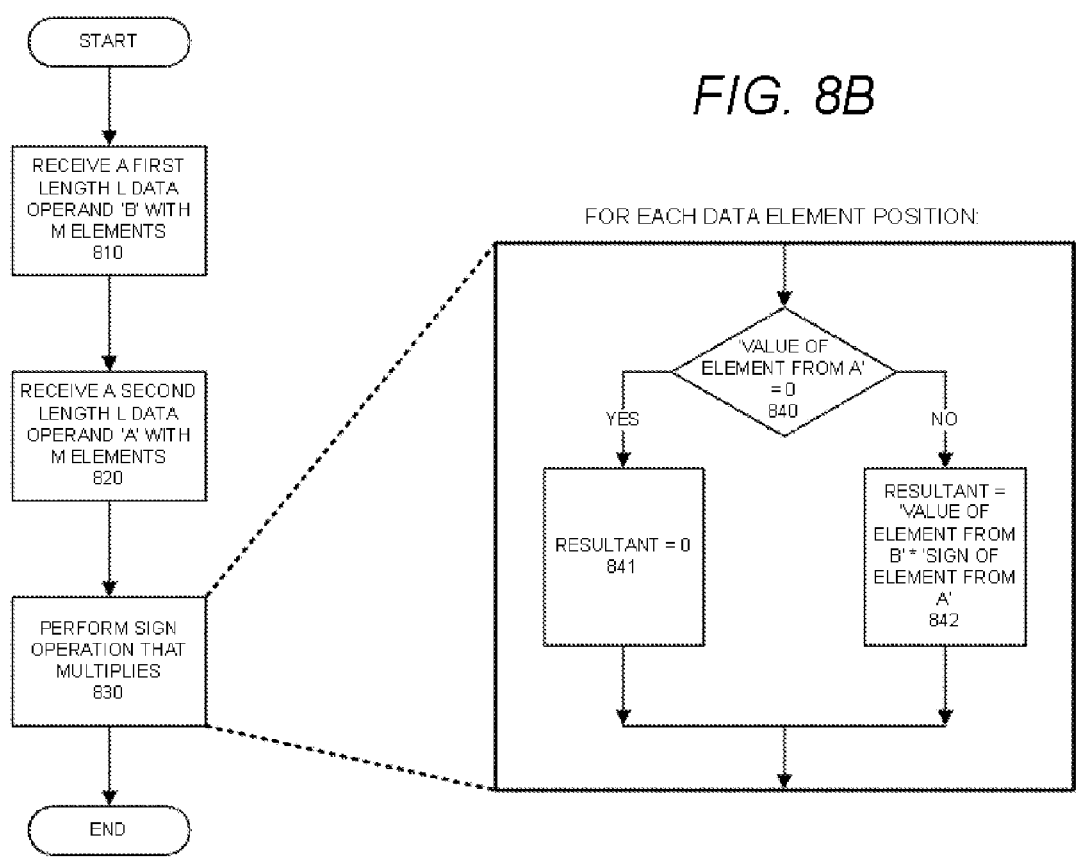
FIG. 8B is a flow chart illustrating another embodiment of a method to perform a sign operation.

FIG. 8B is a flow chart 850 illustrating another embodiment of a method to perform a sign operation. The flow of the method at block 810 and 820 for this embodiment are similar to that of FIG. 8A. In this example, the methodology for block 830 in performing a sign operation that multiplies is somewhat different. The details of the sign operation at block 830 for this embodiment are also further described in terms of what occurs for each data element position. At block 840, a determination is made as to whether the value in the element of data operand A is equal to zero. If the determination is true and the value is zero, a '0' is entered as the resultant value for this data element position at block 841. But if the determination is that the operand A data element for this position is a non-zero value, the resultant value for this data element position is calculated at block 842 as the product of the value for the operand B data element multiplied by the sign of the operand A data element. As in FIG. 8A, the resultant value for each of the data element positions are arranged into the appropriate place in the resultant packed data block.

Figure 9:
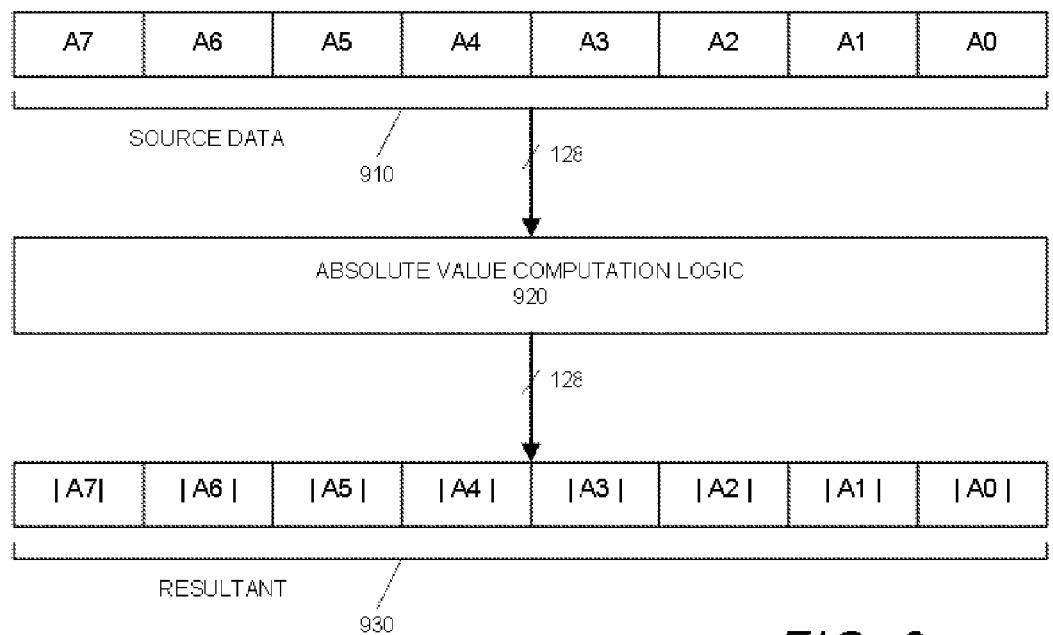
FIG. 9 is a block diagram of one embodiment of logic to perform an absolute value operation on a packed data operand.

FIG. 9 is a block diagram of one embodiment of logic to perform an absolute value operation on a packed data operand. For one embodiment, absolute value operations in accordance to the present invention are implemented as a packed absolute (PABS) instruction to operate on various sized data types. For simplicity, this PABS instruction is described here in general terms with a packed operand having eight data elements. These data elements can be bytes, words, doublewords, etc. depending on the particular implementation. In this example, the packed absolute operation is invoked with a line of code like "PABS SRC1", wherein SRC1 points to a SIMD register or a memory location. In this case, SRC1 is both the data source and result destination. For one embodiment, the instruction format requires two operands and the line would read "PABS SRC1, SRC2". In that this case, the PABS instruction causes the absolute value in data elements of SRC2 to be placed into SRC1. Furthermore, in one embodiment, a packed absolute bytes (PABSB) instruction is provided to generate absolute values of byte data types; a packed absolute words (PABSW) instruction is provided to generate absolute values of word data types; and a packed absolute doublewords (PABSD) instruction is provided to generate absolute values of doubleword data types.

The PABS instruction for an absolute value operation of this embodiment begins with a first data operand SOURCE DATA 910 having eight data elements: A7, A6, A5, A4, A3, A2, A1, and A0. Each individual data element corresponds to a data element position in the resultant 930. The data operand 910 is sent to absolute value computation logic 920 along with a absolute value instruction. The absolute value computation logic 920 modifies the value in each source data element so that the numeric value in the corresponding element position in the resultant 930 will have the unsigned absolute value of that source data element number. For example, the left most resultant element position has the unsigned absolute value of the number of source element A7. This processing of the absolute value is repeated for the entire set of data element positions in the source operand 910. For this embodiment, the resultant location can be the same as the source operand location. In an alternative embodiment where two operands are specified with the PABS instruction, one operand can specify the source and the other can specify the destination.

Compression is frequently implemented in image processing. Video frames are generally compressed in blocks of pixels. Highly compressed video can exhibit blocking artifacts due to the quantization operation. In many coding algorithms, one type of image deterioration that occurs at lower bit rates is called a blocking effect. This effect is caused by the unnatural way of dividing up images into rectangular blocks with a fixed grid during image processing. Because the coding of each block is independent, nothing assures the continuity of the coded image values at the border between blocks. Quantization of the DC coefficient of the discrete cosine transform can add or subtract an offset to a block causing it to become brighter or darker than adjacent blocks and creating the appearance of lines along block boundaries. This can sometimes give rise to prominent artificial edges and blocking artifacts in the coded image. In image sequences, a background grid of non-moving edges viewed against a moving scene can result in a very unnatural and unpleasant type of degradation. In order to prevent these blocking effects from occurring, a deblocking scheme can be use filters to smooth out the artificial edges. These artifacts can be made less noticeable with a deblocking algorithm that smoothes the boundary between blocks. However, the algorithm should not smooth a step between blocks if there is a true edge along the block boundary. Generally the step between adjacent blocks is considered a true edge if the size of the edge step is greater than the step size that could be created by quantization. Similarly, other algorithms can be use to fit surfaces over a block.

Some of the deblocking algorithms for the video compression methods H.263 and MEPG4 use a sign or signum operation and a absolute value operation. In these video deblocking algorithms, the sign function computes the sign of the correction factor. The absolute value operation is used to determine the magnitude of the correction factor and compare variations in the video with predetermined thresholds. Embodiments of SIMD instructions like the PSIGN and PABS as described earlier can be used together in deblocking algorithms for H.263 and MPEG4. The signum operation involves evaluating the sign value from a data and providing an indication of what is the sign value. For instance, a signum operation on a data element will output a '0' if the data element is zero, a '−1' if the data element is negative, and a '+1' if the data element is positive. For one embodiment, the PSIGN instruction in accordance to the present invention can be used to provide the signum functionality.

One approach to nonlinear filter deblocking employs a three step nonlinear filtering approach. First, characterize the block boundary. Second, use the results of the first step to compute factors to correct values of pixels along the block border. And third, correct pixel values of pixels along the border by adding or subtracting factors computed in the second step. The following example describes the H.263 deblocking algorithm of one implementation. A and B are pixels on one side of a block boundary. A 1012 is an array of pixels one pixel distance away from a block boundary. B 1014 is an array of pixels along the block boundary. C and D are pixels on the other side of the boundary. C 1022 is an array along the block boundary on the other side of the boundary from array B. D 1024 is an array of pixels one pixel distance from the block boundary in the same block 1020 as array C 1022. In order to reduce a continuity artifact due to quantization between block X 1010 and block Y 1020, but preserving a real edge, deblocking is performed. The deblocking results are labeled as A', B', C', and D'.

Figure 10:
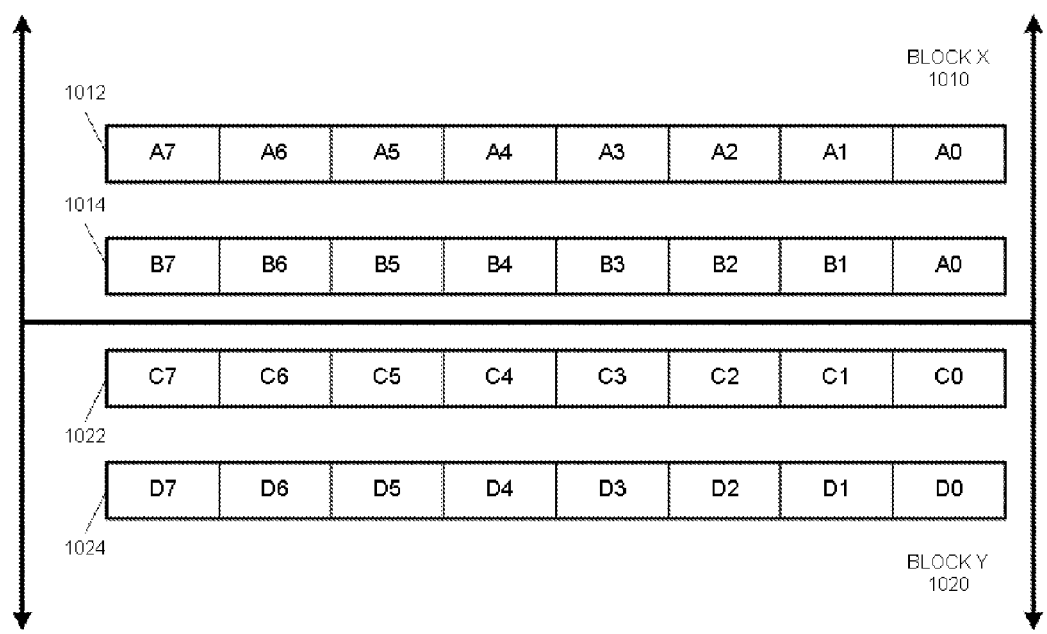
FIG. 10 illustrates the operation of a deblocking algorithm using SIMD instructions in accordance with the present invention.

FIG. 10 illustrates the operation of a deblocking algorithm using SIMD instructions in accordance with the present invention. Two blocks of data 1010, 1020, are shown in FIG. 10. In this example, the blocks contain data for an image or video stream. Each block is comprised of a plurality of rows and columns of data elements. For example, a block in some image processing algorithms is a eight by eight block of data. Here, the illustration is focused on the block boundary between BLOCK X 1010 and BLOCK Y 1020. The bottom two data rows 1012, 1014, are shown for BLOCK X 1010. BLOCK Y 1020 is shown with the top two data rows 1022, 1024. Each data row is comprised of data elements numbered from 7 through 0.

SIMD registers are loaded with the pixel data for arrays A 1012, B 1014, C 1022, and D 1024. First, the block boundary is characterized. The size and direction of the step across the block boundary is determined. This can be represented by the equation:

$$d=(A-4B+4C-D)/8.$$

Then, correction factor for arrays B 1014 and C 1022 are calculated with an updown ramp:

$$d_1=\text{SIGN}(d)\times(\text{MAX}(0,\text{ABS}(d)-\text{MAX}(0,2\times(\text{ABS}(d)-\text{strength})))).$$

The correction factor for arrays A 1012 and D 1024 are calculated:

$$d_2=\text{clip}d1((A-D)/4,d_1/2).$$

Here, the absolute value and maximum and clipping operations are used to compute the magnitude of pixel correction factors $d_1$ and $d_2$. The sign operation also uses the factor d from the first step to compute the sign of the correction factor $d_1$. Correction factors $d_1$ and $d_2$ are either added or subtracted from the pixel values. The boundary pixels for arrays B 1014 and C 1022 are corrected:

$$B'=\text{clip}(B+d_1);\text{ and }C'=\text{clip}(C-d_1).$$

The pixels for arrays A 1012 and D 1024 are then corrected:

$$A'=A-d2;\ D'=D+d_2.$$

The $d_1$ calculation is a function called a updown ramp. The peak value is when d is equal to 'strength' and the value goes to zero when d is equal to '2×strength'. The value of 'strength' is determined by the quantization step size. Generally, 'strength' is about half the step size. The function 'clipd1( )' clips the result of '(A−D)/4' to + or − the absolute value of '$d_1$/2'. The function 'clip( )' clips the evaluated result to a value of '0' or '255'. Embodiments of this algorithm can be implemented with SIMD instructions. For this embodiment, the sign operation can be implemented with a PSIGNB or PSIGNW instruction. Similarly, the absolute value operation can be implemented with PABSB or PABSW. In this embodiment, multiple pixel values for arrays A, B, C and D are loaded into separate SIMD registers. For one embodiment, the deblocking operations are applied to more than one pixel column at a time or in parallel. Multiple values of intermediate values $d_1$ and $d_2$ are computed in separate SIMD registers using sign, absolute value, and maximum instructions. The results A', B', C', and D' are computed in separate SIMD registers. Clipping operations can be computed with SIMD maximum and minimum instructions.

The functionality of a sign instruction as described above is used in the nonlinear filtering deblocking algorithm of this embodiment. Embodiments of this deblocking algorithm can be implemented with coding techniques like those of H.263 or MPEG4 to remove blocking artifacts caused by the quantization operation of these two common video compression methods. By using a sign instruction that multiplies in a deblocking algorithm, embodiments of the present scheme can speed up calculations for these coding algorithms and reduce code size. For example, a single PSIGN instruction can replace the multiple arithmetic instructions that have been needed to perform similar data manipulation or instructions that cannot operate on packed data. Thus the overall throughput can be improved and processing resources freed up.

For one embodiment of a deblocking algorithm, the sign instruction and the absolute value instruction do not have saturation behavior. This means that for a packed absolute value instruction, an N bit data with a value $-2^{n-1}$ will be evaluated to $2^{n-1}$. In the case of a packed sign instruction, an N bit data with a first source element equal to $-2^{n-1}$ and a negative second source element will be evaluated to $2^{n-1}$. In some cases, signed results are needed, so no positive value greater than $2^{n-1}-1$ is permitted. One solution is to force the maximum negative and positive values to have the same magnitude before the PABS or PSIGN instructions are executed.

The sign and absolute value operations of one embodiment can also be applied to an MPEG4 deblocking algorithm as described below. Ten pixels, five n either side of a block boundary, is represented as: V0 V1 V2 V3 V4 V5 V6 V7 V8 V9. The '|' represents the block boundary. First the block boundary is characterized:

count=φ(V0−V1)+φ(V1−V2)+φ(V2−V3)+φ(V3−V4)+φ(V4−V5)+φ(V5−V6)+φ(V6−V7)+φ(V7−V8)+φ(V8−V9), wherein φ(γ)=1 if the ABS(γ)<=THRESHOLD1, else φ(γ)=0.
If count is greater than or equal to THRESHOLD2, use a DC mode, else use default mode.
The block boundary is also DC characterized:

max value=MAX(V1,V2,V3,V4,V5,V6,V7,V8);

min value=MIN(V1,V2,V3,V4,V5,V6,V7,V8).

If (ABS(max value−min value)<2×a quantization factor) then the DC related correction steps 2 and 3 are done, otherwise no correction is made. For the default mode, the correction factor is calculated as:

a3,0=(2×V3−5×V4+5×V5−2×V6)/8;

a3,1=(2×V1−5×V2+5×V3−2×V4)/8;

a3,2=(2×V5−5×V6+5×V7−2×V8)/8;

a3,0'=SIGN(a3,0)×MIN(ABS(a3,0),ABS(a3,1),ABS(a3,2));

d=CLIP(5×(a3,0'−a3,0)/8,0,((V4−V5)/2)×δ(ABS(a3,0)<a quantization factor)), wherein δ( ) evaluates to 1 if true and 0 if false.

The boundary pixels are then corrected. The function CLIP(r, p, q) clips r between p and q. For the DC mode, the correction factor is calculated as:

if $m<1$, then if ABS(V1−V0)<QP, then $p_m=V0$; else $p_m=V1$;

if $1<=m<=8$, then $p_m=V_m$;

if $m>8$, then if ABS(V8−V9)<a quantization factor, then $p_m=V9$, else $p_m=V8$.

Figure 11:
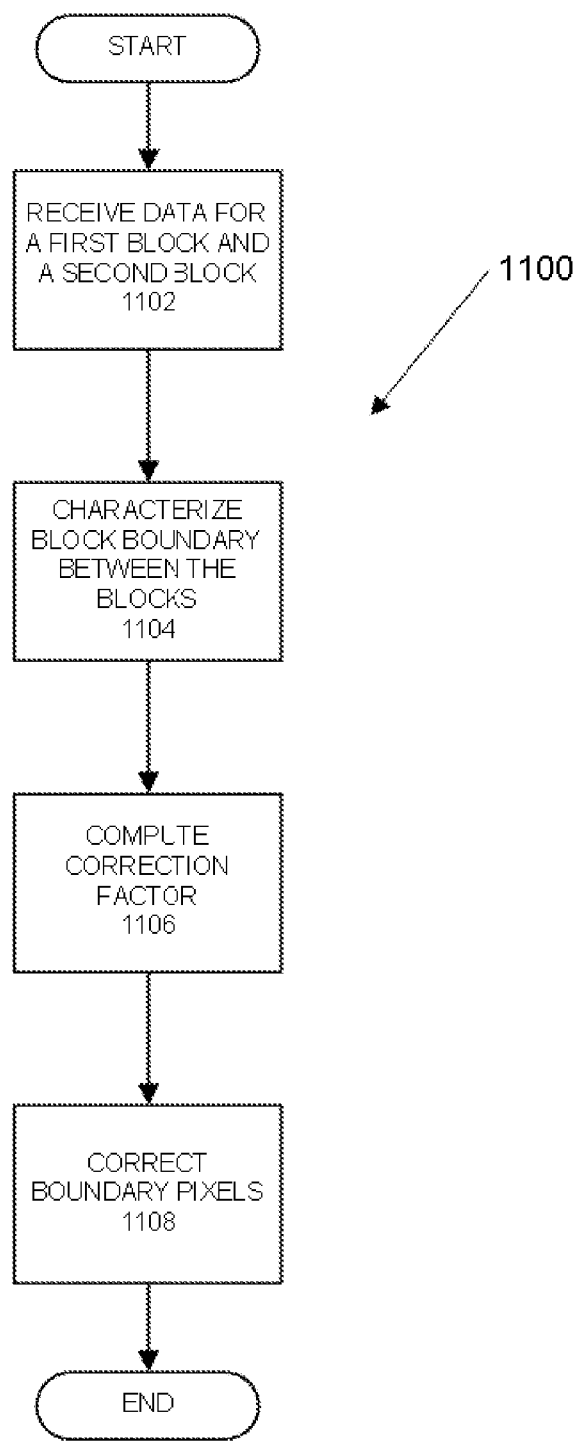
FIG. 11 is a flow chart illustrating one embodiment of a method to perform a deblocking algorithm using SIMD instructions.

FIG. 11 is a flow chart 1100 illustrating one embodiment of a method to perform a deblocking algorithm using SIMD instructions. For example, such a deblocking algorithm can be implemented with code for H.263 and MPEG4 compression methods. At block 1102, pixel data for a first block and a second block is received. The block boundary between the two blocks are characterized at block 1140. One or more correction factors are computed on the packed pixel data at block 1106 through the use of instructions for packed sign operations that multiply and packed absolute value operations. The use of a PSIGN and/or PABS instructions when computing correction factors for a deblocking algorithm can reduce the number of non-SIMD instructions needed and increase the efficiency of processing resources. For example, one embodiment of a deblocking sequence for image processing algorithms in accordance to the present invention employs a PSIGN operation to determine the sign of the correction factor and PABS is used to calculate the magnitude of the correction factor. At block 1108, the boundary pixels for the first block and the second block are corrected with one or more of the correction factors that were calculated with a sign operation that multiplies or an absolute value operation.

Thus, techniques for nonlinear filtering and deblocking applications utilizing SIMD sign and absolute value operations are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:
1. A processor comprising:
a plurality of packed data registers;
a decoder to decode an instruction, the instruction to indicate a first source packed data that is to be stored in the plurality of packed data registers and that is to have a first plurality of packed data elements, to indicate a second source operand;
an execution unit coupled with the decoder and the plurality of packed data registers, the execution unit in response to the instruction, to store a packed data result in a destination packed data register of the plurality of packed data registers, the packed data result to include a plurality of result data elements, each of the result data elements to correspond to a different one of the data elements of the first source packed data in a corresponding position, wherein:
each result data element that corresponds to a bit of value zero of the second source operand is to store a value of the corresponding data element of the first source packed data; and
each result data element that corresponds to a bit of value one of the second source operand is to be based on a negated value of the corresponding data element of the first source packed data.
2. An apparatus comprising:
a plurality of packed data registers;
a decoder to decode an instruction, the instruction to indicate a first source packed data that is to be stored in the plurality of packed data registers and that is to have a first plurality of packed data elements, to indicate a second source operand;
an execution unit coupled with the decoder and the plurality of packed data registers, the execution unit in response to the instruction, to store a packed data result in a destination packed data register of the plurality of packed data registers, the packed data result to include a plurality of result data elements, each of the result data elements to correspond to a different one of the data elements of the first source packed data in a corresponding position, each result data element that corresponds to a zeroed bit of the second source operand is to store a value of the corresponding data element of the first source packed data; and each result data element that corresponds to a set bit of the second source operand is to represent a negated value of the corresponding data element of the first source packed data.

3. An apparatus comprising:

a plurality of packed data registers;

a decoder to decode an instruction, the instruction to indicate a first source packed data that is to be stored in the plurality of packed data registers and that is to have a first plurality of packed data elements, to indicate a second source operand;

an execution unit coupled with the decoder and the plurality of packed data registers, the execution unit in response to the instruction, to store a packed data result in a destination packed data register of the plurality of packed data registers, the packed data result to include a plurality of result data elements, each of the result data elements to correspond to a different one of the data elements of the first source packed data in a corresponding position, each result data element that corresponds to a bit of value zero of the second source operand is to store a value of the corresponding data element of the first source packed data; and each result data element that corresponds to a bit of value one of the second source operand is to represent a negated value of the corresponding data element of the first source packed data.

4. A processor comprising:

a plurality of levels of cache including a Level 1 (L1) cache;

a plurality of registers;

a decoder to decode a single instruction, multiple data (SIMD) instruction, the SIMD instruction having a 32-bit format, the SIMD instruction having a first source operand identifier to identify a first 64-bit source packed data operand that is to be stored in the plurality of registers, and a second source operand identifier to identify a second source operand that is to be stored in the plurality of registers, the first 64-bit source packed data operand to include four 16-bit data elements, the second source operand to include four bits;

an execution unit coupled with the decoder and coupled with the plurality of registers, the execution unit, in response to the SIMD instruction, to store a 64-bit destination packed data operand in the plurality of registers, the 64-bit destination packed data operand to include four 16-bit data elements, each 16-bit data element of the 64-bit destination packed data operand, which corresponds to a bit of the four bits of the second source operand with a value of zero, to store a value of a corresponding 16-bit data element of the first 64-bit source packed data operand, and each 16-bit data element of the 64-bit destination packed data operand, which corresponds to a bit of the four bits of the second source operand with a value of one, to correspond to a negation of a corresponding 16-bit data element of the first 64-bit source packed data operand, wherein the execution unit is also to perform floating point operations, wherein the processor has a very long instruction word (VLIW) architecture.

5. The processor of claim 4, wherein the processor is a digital signal processor (DSP).

6. The processor of claim 4, further comprising a second execution unit coupled with the decoder and coupled with the plurality of registers, the second execution unit also able to perform the SIMD instruction.

7. The processor of claim 4, wherein the decoder is also to decode a SIMD absolute value instruction, and wherein the processor comprises at least one execution unit to execute the decoded SIMD absolute value instruction to perform a SIMD absolute value operation.

8. The processor of claim 7, wherein the decoder is also to decode a SIMD maximum instruction, and a SIMD minimum instruction, and wherein the processor comprises at least one execution unit to execute the decoded SIMD maximum instruction to perform a SIMD maximum operation and to execute the decoded SIMD minimum instruction to perform a SIMD minimum operation.

9. The processor of claim 4, wherein the 16-bit data elements of the 64-bit destination packed data operand are not permitted to have positive values greater than 2n-1-1, where n is 16.

10. A system comprising:

a memory controller;

a processor coupled with the memory controller, wherein the processor has a very long instruction word (VLIW) architecture, the processor comprising:

a plurality of levels of cache including a Level 1 (L1) cache;

a plurality of registers;

a decoder to decode a single instruction, multiple data (SIMD) instruction, the SIMD instruction having a 32-bit format, the SIMD instruction having a first source operand identifier to identify a first 64-bit source packed data operand that is to be stored in the plurality of registers, and a second source operand identifier to identify a second source operand that is to be stored in the plurality of registers, the first 64-bit source packed data operand to include four 16-bit data elements, the second source operand to include four bits;

an execution unit coupled with the decoder and coupled with the plurality of registers, the execution unit, in response to the SIMD instruction, to store a 64-bit destination packed data operand in the plurality of registers, the 64-bit destination packed data operand to include four 16-bit data elements, each 16-bit data element of the 64-bit destination packed data operand, which corresponds to a bit of the four bits of the second source operand with a value of zero, to store a value of a corresponding 16-bit data element of the first 64-bit source packed data operand, and each 16-bit data element of the 64-bit destination packed data operand, which corresponds to a bit of the four bits of the second source operand with a value of one, to correspond to a negation of a corresponding 16-bit data element of the first 64-bit source packed data operand, wherein the execution unit is also to perform floating point operations.

11. The system of claim 10, wherein the processor is a digital signal processor (DSP).

12. The system of claim 10, wherein the system is a system on a chip.

13. The system of claim 10, further comprising a second execution unit coupled with the decoder and coupled with the plurality of registers, the second execution unit also able to perform the SIMD instruction.

14. The system of claim 10, wherein the decoder is also to decode a SIMD absolute value instruction, and wherein the processor comprises at least one execution unit to execute the decoded SIMD absolute value instruction to perform a SIMD absolute value operation.

15. The system of claim 14, wherein the decoder is also to decode a SIMD maximum instruction, and a SIMD minimum instruction, and wherein the processor comprises at least one execution unit to execute the decoded SIMD maximum instruction to perform a SIMD maximum operation and to execute the decoded SIMD minimum instruction to perform a SIMD minimum operation.

16. The system of claim 10, further comprising graphics hardware logic coupled with the processor.

17. The system of claim 10, further comprising a graphics controller coupled with the processor.

18. The system of claim 10, further comprising an audio controller coupled with the processor.

19. The system of claim 10, wherein the 16-bit data elements of the 64-bit destination packed data operand are not permitted to have positive values greater than 2n-1-1, where n is 16.

20. A machine readable storage medium that stores instructions, including a single instruction, multiple data (SIMD) instruction, the SIMD instruction, if performed by a machine, is to cause the machine to perform operations comprising to:

decode the SIMD instruction, the SIMD instruction having a 32-bit format, the SIMD instruction having a first source operand identifier to identify a first 64-bit source packed data operand that is to be stored in the plurality of registers, and a second source operand identifier to identify a second source operand that is to be stored in the plurality of registers, the first 64-bit source packed data operand to include four 16-bit data elements, the second source operand to include four bits;

store a 64-bit destination packed data operand in a plurality of registers, the 64-bit destination packed data operand to include four 16-bit data elements, each 16-bit data element of the 64-bit destination packed data operand, which corresponds to a bit of the four bits of the second source operand with a value of zero, to store a value of a corresponding 16-bit data element of the first 64-bit source packed data operand, and each 16-bit data element of the 64-bit destination packed data operand, which corresponds to a bit of the four bits of the second source operand with a value of one, to correspond to a negation of a corresponding 16-bit data element of the first 64-bit source packed data operand, wherein the execution unit is also to perform floating point operations.

21. The machine readable storage medium of claim 20, wherein the 16-bit data elements of the 64-bit destination packed data operand are not permitted to have positive values greater than 2n-1-1, where n is 16.

* * * * *